US012766451B2

(12) United States Patent
Choi et al.

(10) Patent No.: US 12,766,451 B2
(45) Date of Patent: Oct. 20, 2026

(54) AIR CLEANING SYSTEM

(71) Applicant: LG Electronics Inc., Seoul (KR)

(72) Inventors: Ji Eun Choi, Seoul (KR); Hyungho Park, Seoul (KR); Jinhee Noh, Seoul (KR); Dongryul Park, Seoul (KR); Seongman Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 242 days.

(21) Appl. No.: 18/664,032

(22) Filed: May 14, 2024

(65) Prior Publication Data

US 2024/0299872 A1 Sep. 12, 2024

Related U.S. Application Data

(63) Continuation of application No. 17/464,856, filed on Sep. 2, 2021, now Pat. No. 12,017,172.

(30) Foreign Application Priority Data

Sep. 21, 2020 (KR) ........................ 10-2020-0121591
Aug. 19, 2021 (KR) ........................ 10-2021-0109316

(51) Int. Cl.

*B01D 46/00* (2022.01)
*B01D 46/24* (2006.01)
*B01D 46/42* (2006.01)
*B01D 46/44* (2006.01)

(Continued)

(52) U.S. Cl.

CPC ..... *B01D 46/0049* (2013.01); *B01D 46/0047* (2013.01); *B01D 46/0084* (2013.01); *B01D 46/24* (2013.01); *B01D 46/429* (2013.01); *B01D 46/442* (2013.01); *B01D 46/46* (2013.01); *B01D 46/56* (2022.01); *F24F 8/108* (2021.01); *F24F 11/526* (2018.01); *F24F 11/64* (2018.01); *F24F 11/79* (2018.01); *F24F 13/10* (2013.01); *B01D 2273/30* (2013.01); *B01D 2279/51* (2013.01);

(Continued)

(58) Field of Classification Search

None

See application file for complete search history.

(56) References Cited

U.S. PATENT DOCUMENTS 10,702,819 B2 * 7/2020 Chu .................. B01D 46/0013
2006/0064204 A1 3/2006 Kim et al.

(Continued)

FOREIGN PATENT DOCUMENTS

CN 1510349 A 7/2004
CN 104713171 A 6/2015

(Continued)

OTHER PUBLICATIONS

Chinese Office Action and Search Report for Chinese Application No. 202111060908.8, dated Nov. 21, 2022, with English translation.

(Continued)

*Primary Examiner* — Gabriel E Gitman

(74) *Attorney, Agent, or Firm* — Birch, Stewart, Kolasch & Birch, LLP

(57) ABSTRACT

An air cleaning system can rapidly senses occurrence of local pollution, caused by fine dust, through a remote sensor hub and supplies purified air to a polluted area in a concentrated manner, thereby quickly purifying indoor air.

25 Claims, 33 Drawing Sheets

(51) Int. Cl.

| | |
|---|---|
| ***B01D 46/46*** | (2006.01) |
| ***B01D 46/56*** | (2022.01) |
| ***F24F 8/108*** | (2021.01) |
| ***F24F 8/80*** | (2021.01) |
| ***F24F 11/526*** | (2018.01) |
| ***F24F 11/64*** | (2018.01) |
| ***F24F 11/79*** | (2018.01) |
| ***F24F 13/08*** | (2006.01) |
| ***F24F 13/10*** | (2006.01) |
| *F24F 13/20* | (2006.01) |
| *F24F 110/64* | (2018.01) |

(52) U.S. Cl.

CPC ............... *F24F 8/80* (2021.01); *F24F 13/082* (2013.01); *F24F 2013/205* (2013.01); *F24F 2110/64* (2018.01)

(56) References Cited

U.S. PATENT DOCUMENTS

| | | | | |
|---|---|---|---|---|
| 2016/0255697 | A1 | 9/2016 | Bhide | |
| 2019/0232210 | A1 | 8/2019 | Hur et al. | |
| 2020/0158357 | A1* | 5/2020 | Son | F04D 25/166 |
| 2021/0018208 | A1 | 1/2021 | Shin et al. | |

FOREIGN PATENT DOCUMENTS

| | | | |
|---|---|---|---|
| CN | 204494699 | U | 7/2015 |
| CN | 105716172 | A | 6/2016 |
| CN | 205747195 | U | 11/2016 |
| CN | 106662350 | A | 5/2017 |
| CN | 106813315 | A | 6/2017 |
| CN | 107076137 | A | 8/2017 |
| CN | 107076437 | A | 8/2017 |
| CN | 109489173 | A | 3/2019 |
| KR | 10-2017-0072582 | A | 6/2017 |
| KR | 10-1907313 | B1 | 12/2018 |
| KR | 10-2019-0014235 | A | 2/2019 |
| KR | 10-2019-0031707 | A | 3/2019 |
| KR | 10-2019-0049053 | A | 5/2019 |
| KR | 10-2019-0091231 | A | 8/2019 |
| KR | 10-2019-0106933 | A | 9/2019 |
| KR | 10-2020-0072033 | A | 6/2020 |
| WO | WO2016/027352 | A1 | 2/2016 |

OTHER PUBLICATIONS

Extended European Search Report for European Application No. 21196194.1, dated Feb. 9, 2022.

* cited by examiner

AIR CLEANING SYSTEM

CROSS-REFERENCE TO RELATED APPLICATION

This application is a Continuation of U.S. application Ser. No. 17/464,856, filed on Sep. 2, 2021, which claims priority to and the benefit of Korean Patent Application No. 10-2020-0121591, filed in the Republic of Korea on Sep. 21, 2020, and Korean Patent Application No. 10-2021-0109316, filed in the Republic of Korea on Aug. 19, 2021, the disclosures of which are incorporated herein by reference in their entirety.

TECHNICAL FIELD

Disclosed herein is an air cleaning system, and more specifically, an air cleaning system that can rapidly sense occurrence of local pollution, caused by fine dust, through a remote sensor hub and supply purified air to a polluted area in a concentrated manner, thereby quickly purifying indoor air.

BACKGROUND

Air cleaners include an air blowing device introducing indoor air and a filter collecting pollutants or germs and the like included in the introduced air.

Additionally, the air cleansers include a dust sensor capable of sensing fine dust and ultrafine dust. Further, technologies for controlling over the air cleaners have been developed. Using the technologies, an air cleaner can immediately operate or increase an air amount when a fine dust concentration measured by the dust sensor is at a predetermined level or above, and can supply purified air to an area where fine dust occurs.

In relation to the technologies, a control method of an air cleaner is disclosed in Korean Patent Publication No. 10-2019-0049053. According to the control method, a human body sensor starts to sense a human body, and when the human body is sensed, an air discharge direction of the air cleaner is oriented to a space where the human is present and air in the space is quickly purified, using results of sensing.

In the configuration disclosed in the prior art document, the human body sensor disposed in the air cleaner itself is used to sense a human active area, and the discharge direction of the air cleaner is determined such that purified air is supplied to the active area.

In the configuration, when a pollution source generating fine dust is present at a position that is not related to the human active area or is present at a far distance, effectiveness of the air cleaner cannot be sufficiently ensured.

Additionally, in the configuration, a dust sensor sensing fine dust is disposed in the air cleaner itself. Accordingly, when a pollution source generating fine dust is at a remote position far from the air cleaner, it takes a significant amount of time for the dust sensor to sense generation of fine dust or the dust sensor cannot sense generation of fine dust and respond to the pollution source.

PRIOR ART DOCUMENT

Patent Document (Document 0001) Korean Patent Publication No. 10-2019-0049053

SUMMARY

Technical Problem

The present disclosure is directed to an air cleaning system that immediately senses occurrence of local pollution through a remote sensor hub disposed in an area where fine dust is likely generated and significantly reduces a time gap between fine dust generation and an air cleaner's response.

The present disclosure is also directed to an air cleaning system that supplies purified air in a concentrated manner to a position where local pollution occurs, sensed through the remote sensor hub and, may rapidly purify indoor air.

The present disclosure is also directed to an air cleaning system that distinguishes pollution caused by cooking (cooking pollution) from pollution irrelevant to cooking (non-cooking pollution) in local pollution to respond to the cooking pollution.

The present disclosure is also directed to an air cleaning system that blows purified air intensively to any one area or dispersedly to a plurality of areas depending on a pollution degree or the sort of pollution, when local pollution is sensed in the plurality of areas.

The present disclosure is also directed to an air cleaner that independently controls an air blowing direction of an air blowing device to respond to a pollution degree and the sort of pollution in an indoor area far from the air cleaner in a single air cleaner provide with two or more remote area orientation air blowing devices.

The remote area orientation air blowing device is defined as a circulator, for example.

A remote area orientation denotes blowing air such that the air flows at a slant with respect to a horizontal direction or a perpendicular direction.

The independent control denotes control over the circulators such that each of the circulators operates and stops differently or blows air in the same direction or a different direction. Additionally, the independent control denotes controlling an operation state of each of the circulators differently. That is, a first circulator operates in a specifically fixed direction while a second circulator operates making up-down or left-right rotations at a predetermined angle.

The circulator denotes an air blowing device that changes an air blowing direction at least to an up-down direction or a left-right direction. Accordingly, the plurality of circulators blow air intensively to the same area or blow air in different directions depending on pollution in different indoor areas.

Technical Solution

An air cleaning system in one embodiment may include at least one sensor hub, wherein at least one sensor hub includes a first sensor hub configured to measure first local dust concentrations and disposed at a first position, and a second sensor hub configured to measure second local dust concentrations and disposed at a second position different from the first position. The sensor hub may further include a third sensor hub. The first sensor hub and the second sensor hub may respectively measure the first local dust concentrations and the second local dust concentrations at first time intervals for a second time period to generate first local dust concentration data and second local dust concentration data.

The air cleaning system may further include an air cleaner, wherein the air cleaner further include a controller configured to calculate an average of each of the first local dust concentration data and the second local dust concentration data that are received for the second time period, and to respectively compare the calculated average of the first local dust concentration data and the calculated average of the second local dust concentration data with a reference average.

Accordingly, occurrence of local pollution may be immediately sensed through a remote sensor hub and purified air may be supplied to a position where local pollution occurs in a concentrated manner, thereby rapidly purifying indoor air.

At least one of the sensor hubs and the main dust sensor may respectively measure local dust concentrations and reference dust concentrations at first time intervals and generate local dust concentration data and reference dust concentration data, and the controller may calculate an average of each of the local dust concentration data and the reference dust concentration data that are received for a second time period longer than the first time interval. The controller may calculate a reference average by multiplying the calculated reference dust concentration average by a predetermined margin coefficient and compare the calculated reference average with the local dust concentration average.

An air cleaner in another embodiment may further include a position sensing module configured to identify a position of at least one of the sensor hubs and to generate position data of at least one of the sensor hubs, and the controller may receive the position data from the position sensing module, and based on the received position data and pollution data, may change the discharge direction of the circulator toward at least one of the sensor hubs. An air cleaner in another embodiment may include a first air cleaning module that is provided with a first filter and a first air blowing fan configured to move an air, having passed through the first filter and purified, upward, and a second air cleaning module that is provided with a second filter and a second air blowing fan configured to move an air, having passed through the second filter and purified, upward and that is disposed below the first air cleaning module, the circulator may include a first circulator disposed on the first air cleaning module and configured to change a discharge direction of the air purified by the first air cleaning module and to accelerate and discharge the air, and a second circulator disposed on the second air cleaning module and configured to change a discharge direction of the air purified by the second air cleaning module to provide an air cleaning system in which the discharge directions of the air purified may be change using a single air cleaner.

The air cleaning system may further include at least one remote sensor hub to change discharge directions of the first circulator and the second circulator toward at least one sensor hub described above based on local dust concentrations.

Additionally, in the air cleaner of one embodiment, the controller may control the first circulator and the second circulator such that an air discharge amount of the first circulator and an air discharge amount of the second circulator are respectively maintained at a maximum level when the discharge direction of the first circulator and the discharge direction of the second circulator are changed.

Further, in the air cleaner of one embodiment, the controller may receive local dust concentration data and reference dust concentration data, measured at the first time intervals, again after the discharge direction of the circulator is changed, and may control operation of one or more circulators provided in the air cleaner based on the local dust concentration data and the reference dust concentration data, received for the second time period, after the discharge direction of the circulator is changed.

The controller may receive first position data of the first sensor hub and second position data of the second sensor hub from the position sensing module when determining at least one of the first local dust concentration average and the second local dust concentration average exceeds the reference average. Additionally, the controller may calculate a first distance from the air cleaner to the first sensor hub and a second distance from the air cleaner to the second sensor hub.

The controller may compare the first distance and the second distance and change the discharge direction of the first circulator and the discharge direction of the second circulator when determining the first local dust concentration average and the second local dust concentration average all exceed the reference average.

The controller may control an amount of air of the first circulator and the second circulator/intensity of stream of air of the first circulator and the second circulator based on sensed or calculated magnitude of pollution and the distances.

The controller may control a left-right rotation angle of the first or the second circulator based on the distances from the air cleaner to the first sensor hub and to the second sensor hub or based on the an angle formed by the first and second sensor hubs with respect to the air cleaner.

The controller may select a plurality of circulators provide in the air cleaner to change a direction based on the distance from the air cleaner to each of the sensor hubs. That is, the controller may change the discharge direction of the first circulator toward the first sensor hub and change and maintain the discharge direction of the second circulator toward the second sensor hub when determining the first distance is greater than or the same as the second distance.

The controller may change the discharge direction of the first circulator toward the second sensor hub and change and maintain the discharge direction of the second circulator toward the first sensor hub when determining the second distance is greater than the first distance.

The first circulator and the second circulator may blow a different amount of air or blow air in a different way to have a different air blowing distance.

The controller may change and maintain the discharge direction of the first circulator and the discharge direction of the second circulator toward the first sensor hub when determining the first local dust concentration average exceeds the reference average and the second local dust concentration average does not exceed the reference average.

At least one of the sensor hubs in another embodiment may include a first sensor hub configured to measure first local dust concentrations and disposed at a first position, a second sensor hub configured to measure second local dust concentrations and disposed at a second position different from the first position, and a third sensor hub configured to measure third local dust concentrations and disposed at a third position different from the first position and the second position, the first sensor hub, the second sensor hub and the third sensor hub may respectively measure first local dust concentrations, second local dust concentrations and third local dust concentrations at first time intervals and generate first local dust concentration data, second local dust concentration data and third local dust concentration data. The controller may calculate an average of each of the first local dust concentration data, the second local dust concentration data and the third local dust concentration data that are received for the second time period and compare the calculated first local dust concentration average, the calculated second local dust concentration average and the calculated third local dust concentration average respectively with the reference average.

The controller may receive first position data of the first sensor hub, second position data of the second sensor hub and third position data of the third sensor hub from the position sensing module and calculate a first distance from the air cleaner to the first sensor hub, a second distance from the air cleaner to the second sensor hub and a third distance from the air cleaner to the third sensor hub when determining at least one of the first local dust concentration average, the second local dust concentration average and the third local dust concentration average exceeds the reference average.

The controller may continuously change the discharge direction of the first circulator and the discharge direction of the second circulator such that the discharge directions of the first circulator and the second circulator are consecutively and repeatedly oriented to the first sensor hub, the second sensor hub and the third sensor hub when determining the first local dust concentration average, the second local dust concentration average and the third local dust concentration average all exceed the reference average.

The controller may compare the first distance and the second distance and change the discharge direction of the first circulator and the discharge direction of the second circulator when determining the first local dust concentration average and the second local dust concentration average all exceed the reference average and the third local dust concentration average does not exceed the reference average.

The controller may change the discharge direction of the first circulator toward the first sensor hub and change and maintain the discharge direction of the second circulator toward the second sensor hub when determining the first distance is greater than or the same as the second distance.

The controller may change the discharge direction of the first circulator toward the second sensor hub, and change and maintain the discharge direction of the second circulator toward the first sensor hub when determining the second distance is greater than the first distance.

The controller may change and maintain the discharge direction of the first circulator and the discharge direction of the second circulator toward the first sensor hub when determining the first local dust concentration average exceeds the reference average and the second local dust concentration average and the third local dust concentration average do not exceed the reference average.

An air purifier in another embodiment provides an air cleaner that is provided with two or more remote area orientation circulators and ensures a range of left-right rotations of the circulators sufficiently such that the circulators rotate within a wide range of rotation angles and generates intensive air currents or dispersed air currents, while suctioning polluted air in an indoor space in different directions and suctioning and purifying pollutants spread in the indoor space quickly. The different directions include suction flow paths that that are at least opposite to one another, and for example, suctioning air in left and right directions, or front and rear directions or a direction of 360 degrees.

The intensive air currents denote air currents formed as a result of blowing of air by two or more circulators to one polluted area at the same time. The dispersed air currents denote air currents formed as a result of blowing of air by the two or more air circulators in different directions. In the dispersed air currents, each of the two or more circulators blow air in different polluted areas in a state of being fixed, or one circulator blows air in a state of being fixed and the other blows air while making left-right rotations, or the two or more circulators blow air while making rotations. In the case, the rotations are made in the same direction or different directions.

Each of the circulators may provide an air cleaner disposed at a position corresponding to two or more discharge portions configured to discharge the suctioned polluted air in a perpendicular direction. The corresponding position denotes disposition on discharge currents of purified air or disposition near the discharge portion. Thus, the circulator suctions at least the purified air to blow the same to a remote area.

An air cleaner in yet another embodiment may include a first purifying module having a first suction portion formed around a first case having a cylindrical shape or a polygon shape, and a first discharge portion configured to filter pollutants suctioned through the first suction portion and to discharge the filtered pollutants upward; a second purifying module having a second suction portion formed around a second case having a cylindrical shape or a polygon shape, and a second discharge portion configured to filter pollutants suctioned through the second suction portion and to discharge the filtered pollutants upward; a first circulator disposed in/at or on/over the first discharge portion and making left-right rotations; and a second circulator disposed in/at or on/over the second discharge portion and making left-right rotations, and the second purifying module may be disposed on/over the first purifying module, while the first circulator may be disposed under/below the second purifying module.

The first and second discharge portions form an outer body having a cylindrical shape or a polygon shape, an inner body formed inside the outer body and having a cylindrical shape or a polygon shape, and a discharge path between the outer body and the inner body.

A first circulator in one embodiment may include an outer circumferential wall having a cylindrical shape, an inner circumferential wall disposed inside the outer circumferential wall and having a cylindrical shape, and a discharge grill connecting the outer circumferential wall and the inner circumferential wall, and may be disposed in/at the first discharge portion and make left-right swivels.

Additionally, a guide, which is extended upward from the inner body or an inside of the inner body, extended radially with respect to a lengthwise direction of the air cleaner and configured to guide the discharge path radially (horizontally), may be disposed between an upper portion of the first purifying module and a lower portion of the second purifying module. The guide may space the first and second purifying modules in an up-down direction to form a space, and discharged air of the first module may be discharged to the space and then guided radially by the guide. The guide may partition the space between the first purifying module and the second purifying module into upper and lower portions, and the lower portion of the partitioned spaces may form a discharge path of the first purifying module.

The discharge grill may be provided with a plurality of vanes and guide discharged air. The vane may be disposed in parallel in the same direction.

The vanes may be formed perpendicularly, or at least a portion of the vanes may be bent in the same direction or formed at a slant in the same direction.

A second circulator in another embodiment may include an outer circumferential wall having a cylindrical shape, an inner circumferential wall disposed inside the outer circumferential wall and having a cylindrical shape, and a discharge grill connecting the inner circumferential wall and the outer circumferential wall, and may be swivably disposed in/at the second discharge portion. The discharge grill may include a plurality of vanes, and at least a portion of the vanes may be spaced at regular intervals in parallel in the same direction.

Additionally, a guide, which is extended upward from the inner body of the second circulator or an inside of the inner body of the second circulator, extended radially with respect to a lengthwise direction of the air cleaner and configured to guide the discharge path radially (horizontally), may be further included. That is, the first and second circulators may send purified air discharged from the first and second discharge portions to a remote area in the same way.

A second circulator in yet another embodiment may be disposed on/over the second discharge portion and make left-right swivels in an inclined state. In this case, the guide configured to guide the discharge path of the second discharge portion radially may not be provided. That is, the first circulator and the second circulator may send discharge air to a remote area in a different way. In this case, the second circulator may send air farther than the first circulator. A direction of the second circulator may change in the up-down direction to send air upward while the first circulator sends discharged air making left-right rotations.

The air cleaning system in one embodiment may include an air cleaner including a plurality of circulators forming two or more remote area orientation air flows and making left-right rotations; and two or more sensor hubs spaced from the air cleaner and disposed in different positions to sense pollution in a corresponding area; and a control module configured to control an air blowing direction and a fixation or rotation movement of the plurality of circulators of the air cleaner, and the control module may control the circulator such that the circulator intensively blow air to any one of the sensor hubs.

The control module may be included in the air cleaner, or may be provided in addition to the air cleaner and communicate with the air cleaner.

The control module may control a direction and swivel of the circulator based on pollution data delivered by the sensor hub.

When any one of pollution degrees received from the sensor hubs is greater than a predetermined reference value, the intensive control where two or more circulators operate fixedly toward any one of the sensor hubs may be performed.

The control module may perform disperse control to control the plurality of circulators differently. In this case, the pollution degrees may be provided when all the circulators operate in an operation mode of the air cleaner or in a predetermined order of control. Additionally, when the pollution degrees of the two or more sensor hubs are the reference value or greater, the control module may perform the disperse control.

The disperse control may be performed in different ways. First, the circulator may be fixed toward each sensor hub or may make left-right rotations around each sensor hub or between outermost sensor hubs. Second, any one of the circulators may be fixed toward any one of the sensor hubs, and another circulator may rotate around another sensor hub or rotate between any one sensor hub and another sensor hub. When three or more sensor hubs are provided, . . . may rotate between outermost sensor hubs.

In another embodiment, when an angle between the outermost sensor hubs is a reference angle or greater with respect to the air cleaner, the circulators may divide an area and perform the disperse control in a different rotation area. In this case, the reference angle and the rotation angle of each circulator may be preferably 65 degrees, for example.

In another embodiment, the control module may find out pollution caused by cooking (cooking pollution) from pollution data received from each sensor hub.

When ascertaining the cooking pollution, the control module may control the plurality of circulators such that the plurality of circulators performs the intensive control toward a corresponding sensor hub.

When a pollution degree of a specific sensor hub reaches a predetermined cooking pollution degree or when a change in pollution degrees is a reference value or greater, the control module may ascertain the cooking pollution occurs and perform the intensive control toward a corresponding sensor hub.

In another way, when any one of the sensor hubs is disposed in the kitchen, which is a space for cooking, and the user turns on the sensor hub, the control module may perform the intensive control toward the corresponding area, and when pollution data of the corresponding censor hub meets the above conditions, the control module may ascertain cooking is being performed and perform the intensive control.

In the intensive control caused by the cooking pollution, all the circulators may blow a maximum amount of air.

Positions of the sensor hubs may be previously set in the control module, or each sensor hub may send position data to the control module.

In yet another embodiment, the air cleaner may be provided with a main sensor, the main sensor may compare data of each sensor hub, and the control module may perform the intensive control or the disperse control toward each circulator.

When the pollution degrees of the sensor hubs are all greater than a pollution degree of the main sensor, each circulator may operate making left-right rotations (swing operation) within a range of the sensor hub. In the swing operation, each circulator may rotate between the sensor hubs or around each sensor hub.

When the pollution degree of any one of the sensor hubs is greater the pollution degree of the main sensor, the control module may fix all the circulators to the sensor hub or at least one of the circulators in a corresponding direction.

When the pollution degree of the main sensor is greater than the pollution degree of the sensor hub, the control module may stop the circulator and operate the first and second purifying modules. In this case, the circulator may perform the swing operation.

Advantageous Effect

An air cleaning system according to the present disclosure may immediately sense occurrence of local pollution through a remote sensor hub disposed in an area where fine dust is likely generated and may significantly reduce a time gap between fine dust generation and an air cleaner's response.

The air cleaning system according to the present disclosure may supply purified air in a concentrated manner to a position where local pollution occurs, sensed through the remote sensor hub, and may rapidly purify indoor air.

Specific effects are described along with the above-described effects in the section of Detailed Description.

BRIEF DESCRIPTION OF DRAWING

The accompanying drawings constitute a part of the specification, illustrate one or more embodiments in the disclosure, and together with the specification, explain the disclosure, wherein.

DETAILED DESCRIPTION

Below, an air cleaning system according to several embodiments is described.

Figure 1:
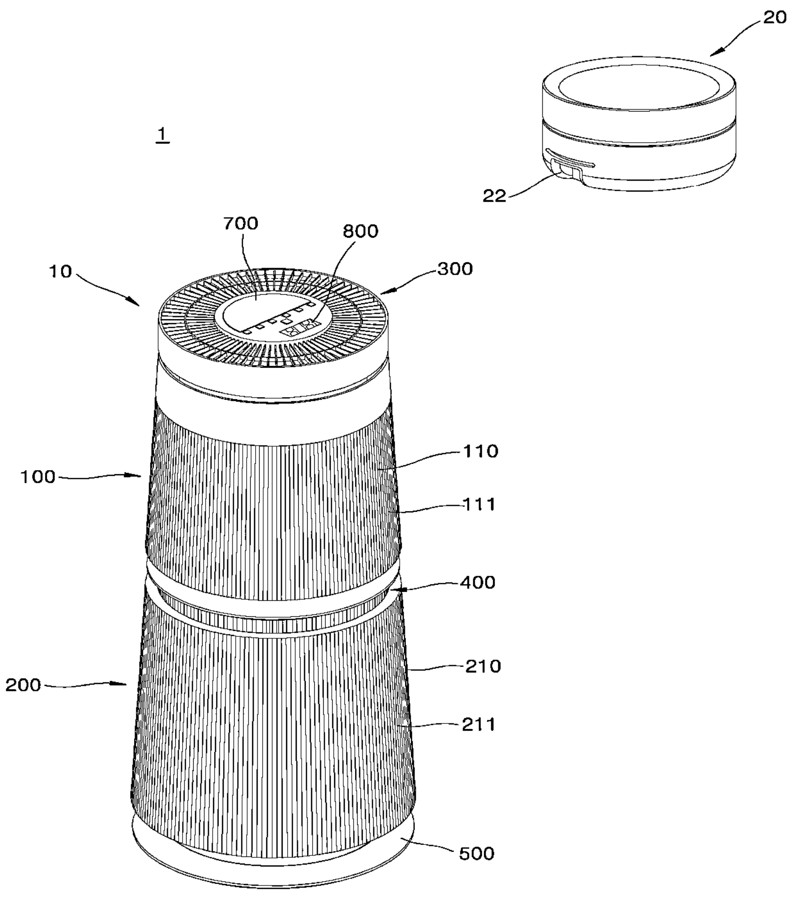
FIG. 1 is a perspective view showing an air cleaner and a sensor hub of an air cleaning system according to the present disclosure.
Figure 2:
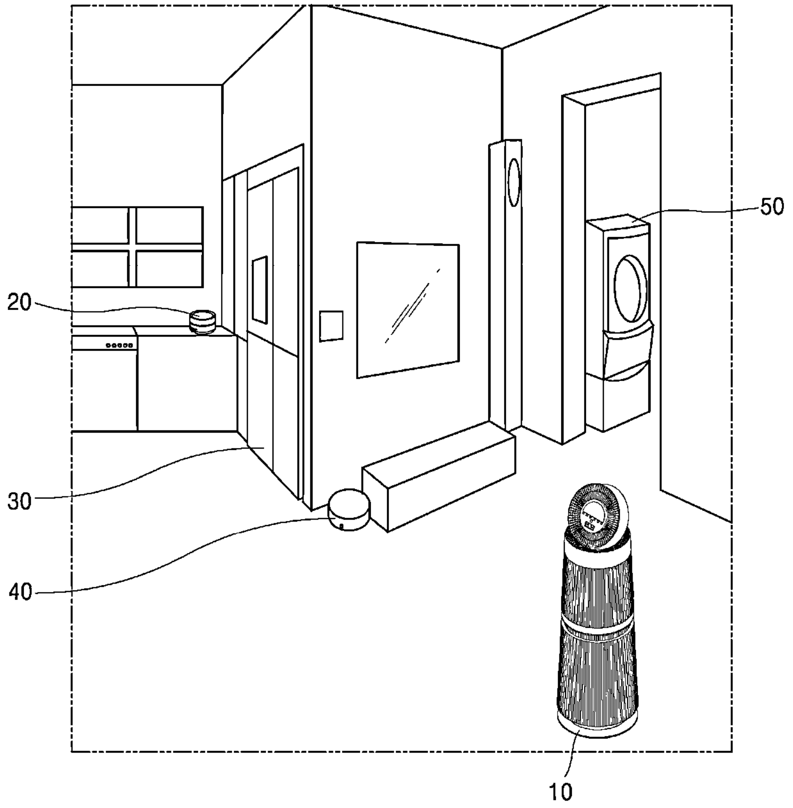
FIG. 2 is a schematic view showing the air cleaner and the sensor hub in FIG. 1 disposed in an indoor space.

FIG. 1 is a perspective view showing an air cleaner 10 and a sensor hub 20 of an air cleaning system 1 according to the present disclosure, and FIG. 2 is a schematic view showing the air cleaner 10 and the sensor hub 20 in FIG. 1 disposed in an indoor space.

As illustrated in FIGS. 1 and 2, the air cleaning system 1 according to the disclosure may include an air cleaner 10 filtering and discharging air, and a sensor hub 20 spaced from the air cleaner 10 and configured to measure a local dust concentration of ambient air.

The sensor hub 20 of the air cleaning system 1 according to the disclosure does not aim to measure air quality around the air cleaner 10. Rather, the sensor hub 20 may be disposed at a position such as a kitchen or a living room in ordinary homes, where generation of large amounts of pollutants such as fine dust is predicted, and may be configured to sense pollutants in an initial stage of generation of pollutants.

The sensor hub 20, as described below, may include a plurality of sensors for measuring indoor air quality, and in particular, may be provided with a dust sensor for sensing fine dust generation and measuring fine dust concentration. To distinguish the dust sensor in the sensor hub from a dust sensor in the air cleaner 10, the dust sensor in the air cleaner 10 is referred to as a main dust sensor Spm, and the dust sensor in the sensor hub 20 is referred to as a sub dust sensor Sps, hereunder.

Additionally, the sensor hub 20 may transmit data on dust concentrations measured through the sub dust sensor Sps to the air cleaner 10 in real time, based on wireless communication. To this end, the sensor hub 20 may be provided with a wireless communicator 950.

The sensor hub 20 may connect to a wireless network through the wireless communicator 950, and may transmit and receive various types of information to a user terminal through the wireless network. Various types of information may include information delivered from various household appliances such as a refrigerator 30, a robot vacuum cleaner 40, a washing machine 50 and the like that can connect to the wireless network/the sensor hub based on wireless communication, as illustrated in FIG. 2.

Figure 20:
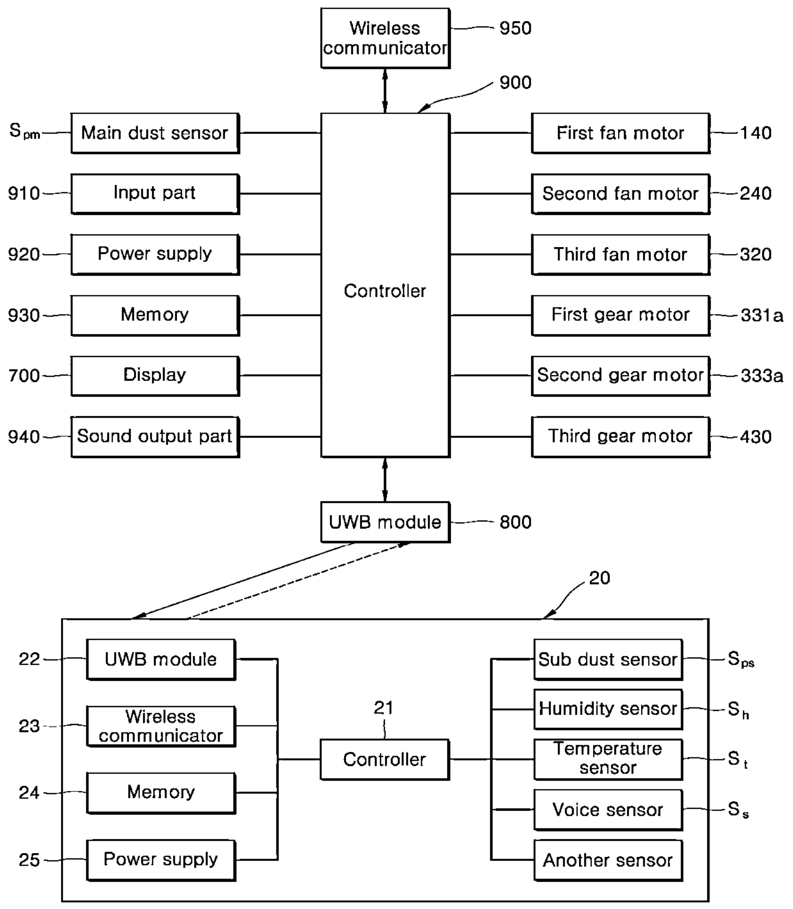
FIG. 20 is a function block diagram for describing configurations of a controller of an air cleaner and sensor hubs.

Specific functions of the sensor hub 20 are described hereunder with reference to FIG. 20 and its following drawings.

The air cleaner 10 may include a first air cleaning module 100 and a second air cleaning module 200 that respectively suctions, filters and discharges ambient indoor air.

The first air cleaning module 100 and the second air cleaning module 200 may be arranged in an up-down direction, as illustrated in FIG. 1.

In this case, the first air cleaning module 100 may suction and filter upper indoor air, and the second air cleaning module 200 may suction and filter lower indoor air.

The first air cleaning module 100 may be referred to as an upper air cleaning module or an upper module as the first air cleaning module is disposed in an upper portion of the air cleaner, and the second air cleaning module 200 may be referred to as a lower air cleaning module or a lower module as the second air cleaning module is disposed in a lower portion of the air cleaner.

FIGS. 1 and 2 show a dual-type air cleaner 10 in which the first air cleaning module 100 and the second air cleaning module 200 are combined and included. However, a single-type air cleaner 10 only including the first air cleaning module 100 may also be applied.

For convenience of description, a dual-type air cleaner 10 is described hereunder. However, the air cleaner according to the disclosure is not limited to the dual-type air cleaner.

Figure 3:
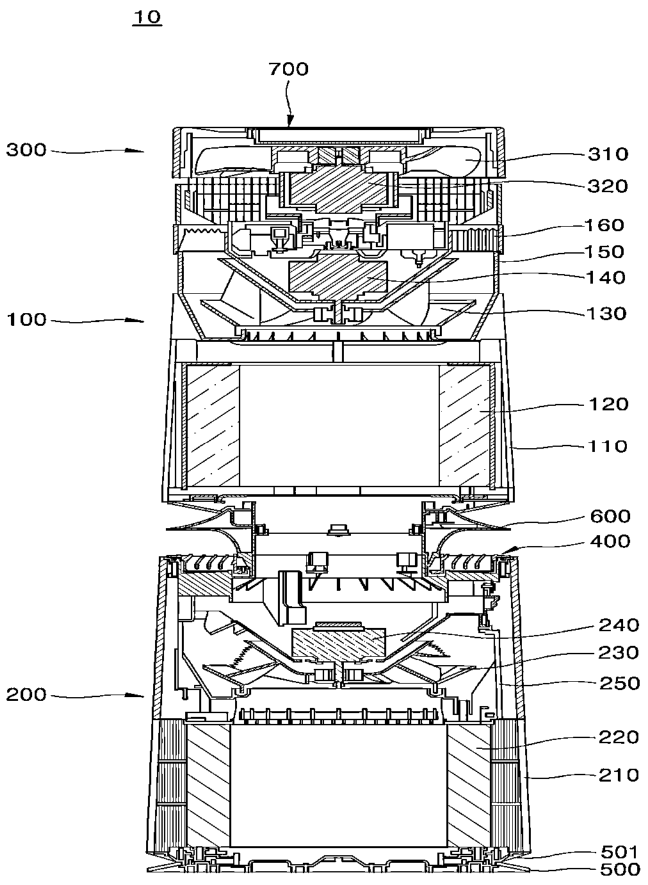
FIG. 3 is a cross-sectional view showing the air cleaner in FIGS. 1 and 2.
Figure 4:
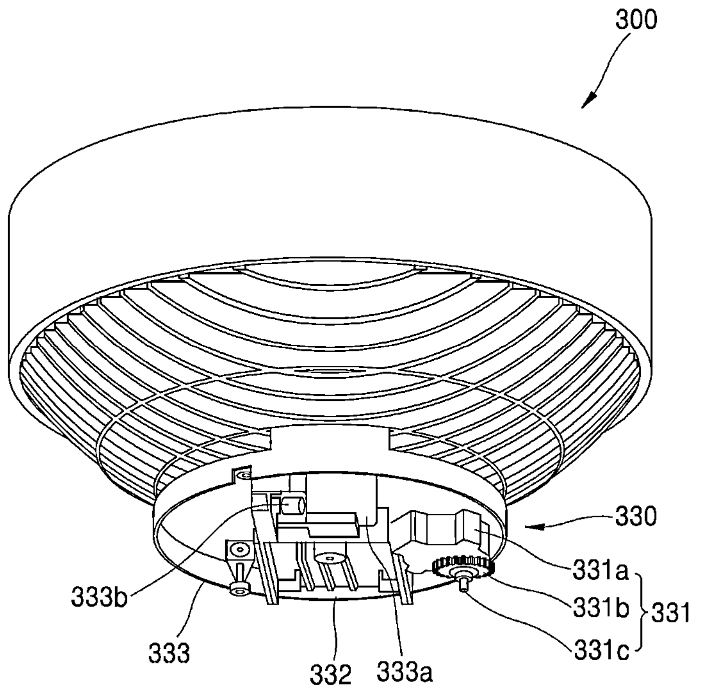
FIG. 4 is a bottom perspective view showing the first circulator in FIG. 3.
Figure 5:
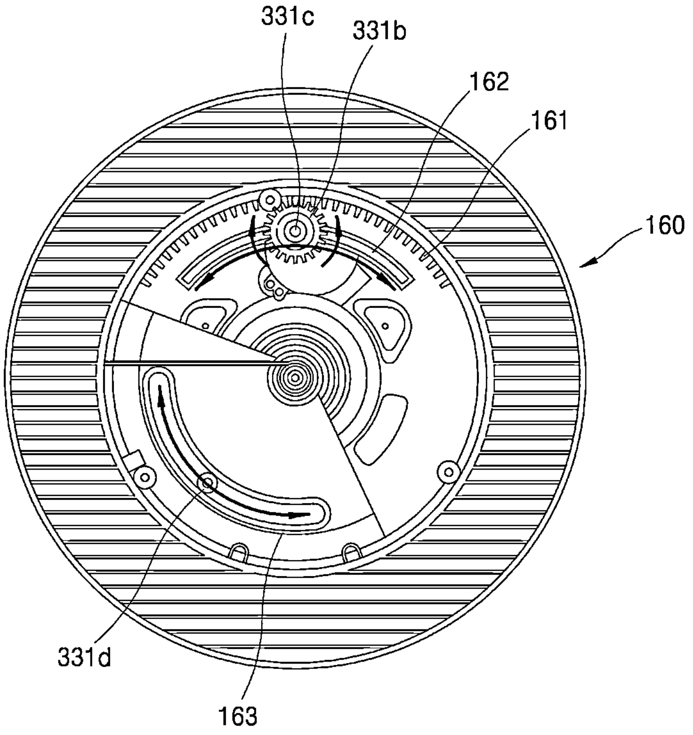
FIG. 5 is a bottom view showing the first circulator in FIG. 4.

The air cleaner 10, as illustrated in FIG. 3, may include a first case 110 forming an exterior of the first air cleaning module 100, and a second case 210 forming an exterior of the second air cleaning module 200.

The first case 110 may have a cylindrical shape, and specifically, may have a circular truncated cone shape having an upper diameter less than a lower diameter. Additionally, a first suction portion 111, through which air is suctioned, may be formed into a plurality of through holes that pass through the first case 110 and extends, on the first case 110. The first suction portion 111 may be formed evenly along an outer circumferential surface of the first case 110 and configured to suction air in all directions (at 360 degrees).

The second case 210 may have a cylindrical shape similar to that of the first case 110, and specifically, may have a circular truncated cone shape having an upper diameter less than a lower diameter. Additionally, a second suction portion 211, through which air is suctioned, may be formed into a plurality of through holes that pass through the second case 210 and extend, on the second case 210. Like the first suction portion 111, the second suction portion 211 may be formed evenly along an outer circumferential surface of the second case 210 and configured to suction air in all directions (at 360 degrees).

The air cleaner 10 may include a partition 600 provided between the first air cleaning module and the second air cleaning module. The first air cleaning module 100 may be spaced and disposed upward from the second air cleaning module 200 by the partition 600. The partition 600 may separate or block an air flow generated by the first air cleaning module and an air flow generated by the second air cleaning module.

The second air cleaning module 200 may be provided with a base 500 disposed on a floor, in a lower portion thereof. The base 500 may be spaced and disposed downward from a lower end portion of the second case 210. In a space between the second case and the base, a base suction portion 501 through which air is suctioned into the second air cleaning module 200 may be formed.

The first case 110 may accommodate a first filter member 120, a first air blowing fan 130, and a first fan motor 140 constituting the first air cleaning module 100.

The first filter member 120 may have a cylindrical shape an upper portion of which is open. Air having passed through the first suction portion 111 may pass through an outer circumferential surface of the first filter member 120, may flow to an inside of the first filter member 120 and may be discharged through the open upper portion. The air having passed through the first filter member 120 may flow into the first air blowing fan 130.

The first filter member 120, as illustrated in FIG. 3, may be provided with a first fan housing 150, on an upper side thereof. The first air blowing fan 130 may be accommodated inside the first fan housing 150.

The first air blowing fan 130 may suction air in a rotational axis direction and discharge air upward in a radial direction. The first air blowing fan may be formed like a centrifugal fan, for example.

The first fan motor 140 generating rotation driving force of the first air blowing fan 130 may be disposed on an upper side of the first air blowing fan 130.

Air discharged by the first air blowing fan 130 may pass through a discharge guide 160 on the upper side of the first air blowing fan 130, and may be discharged to the outside described below or may be supplied to a first circulator 300 described below.

The second case 210 may accommodate a second filter member 220, a second air lowing fan 230 and a second fan motor 240 constituting the second air cleaning module 200.

Like the first filter member 120, the second filter member 220 may have a cylindrical shape an upper portion of which is open. Air having passed through the second suction portion 211 may pass through an outer circumferential surface of the second filter member 220, may flow to an inside of the second filter member 220 and may be discharged through the open upper portion. The air having passed through the second filter member 220 may flow into the second air blowing fan 230.

Additionally, a second fan housing 250 may be disposed inside an upper side of the second filter member 220. The second air blowing fan 230 may be accommodated inside the second fan housing 250.

The second air blowing fan 230 may suction air in a rotational axis direction and discharge air upward in a radial direction. Like the first air blowing fan 130, the second air blowing fan may be formed like a centrifugal fan, for example.

The second fan motor 240 generating rotation driving force of the second air blowing fan 230 may be disposed on an upper side of the second air blowing fan 230.

Air discharged by the second air blowing fan 230 may be supplied to a second circulator 400 disposed on the upper side of the second air blowing fan 230.

The first fan motor 140 and a rotational axis of the first air blowing fan 130, and the second fan motor 240 and a rotational axis of the second air blowing fan 230, generating rotation driving force, may be respectively arranged in the up-down direction on the same straight line, as illustrated in FIG. 3. Accordingly, vibration and noise generated as a result of rotation of the first air blowing fan 130 and the second air blowing fan 230 may be minimized.

A well-known configuration in the art may be applied to inner structures of the first air cleaning module 100 and the second air cleaning module 200. Detailed description of the configuration is omitted.

The air cleaner 10 of the air cleaning system 1 according to the present disclosure may include a first circulator 300 disposed on an upper side of the discharge guide 160 of the first air cleaning module 100.

With respect to an air flow, air having passed through the discharge guide 160 of the first air cleaning module 100 may at least partially flow simply by way of the first circulator 300 or may be accelerated by the first circulator 300 and discharged outward.

To accelerate speed of the air having passed through the first air cleaning module 100, the first circulator 300 may be provided with a third air blowing fan 310, which is an axial-flow fan, and a third fan motor 320 generating rotation driving force of the third air blowing fan 310.

Additionally, the first circulator 300 may be configured to move to change a discharge direction F1 of discharged air.

That is, the first circulator 300 may have a structure in which the first circulator rotates in the up-down direction (a B-direction) between a state (a first position) where the first circulator lies as illustrated in FIG. 1 and a state (a second position) where the first circulator stands at a slant as illustrated in FIG. 2.

Figure 6:
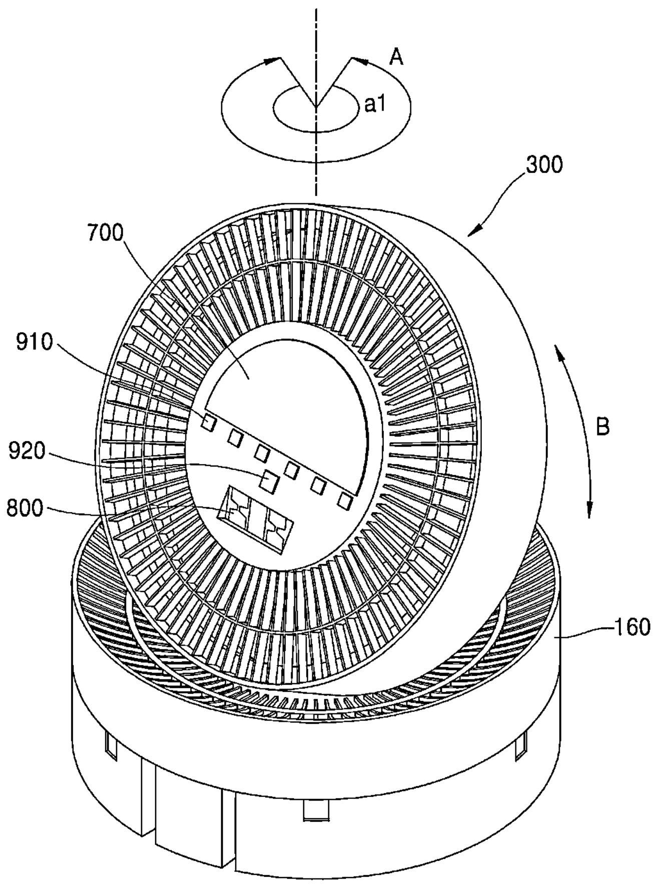
FIG. 6 is a perspective showing an operation state of the first circulator in FIG. 3, and FIGS. 7 and 8 are side views showing the first circulator.
Figure 7:
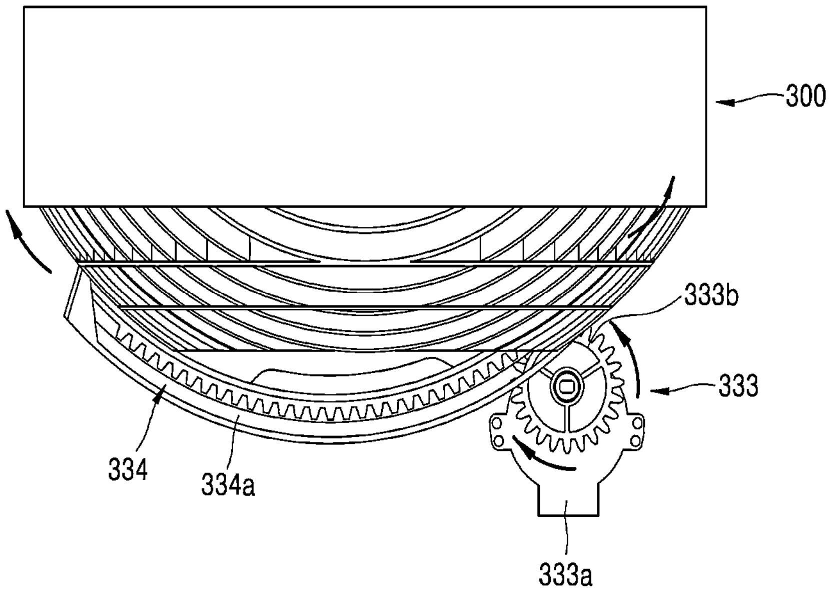

Further, the first circulator 300 may have a structure in which the first circulator rotates in a left-right direction (an A-direction) as illustrated in FIG. 6.

To this end, the first circulator 300 may be provided with a rotation guide 330 guiding a left-right (the A direction) rotation and an up-down (the B direction) rotation of the first circulator 300, on a lower side thereof.

The rotation guide 330 may include a first guide 331 generating the left-right rotation of the first circulator 300, and a second guide 332 generating the up-down rotation of the first circulator 300.

The first guide 331 may include a first gear motor **331*a* configured to generate driving force, and a first gear 331*b* coupled to a first gear shaft 331*c* of the first gear motor 331*a*** and configured to rotate.

For example, the first gear motor 331*a* may be a step motor in which a rotation angle is easily controlled and which rotates in both directions.

The first gear 331*b* may be gear-coupled to a first rack gear 161 disposed in the discharge guide 160 of the first air cleaning module 100. Accordingly, when the first gear motor 331*a* is driven, the first gear 331*b* may rotate, work with the first rack gear 161 and move in a circumferential direction along the first rack gear 161 in a fixed state.

The first gear shaft 331*c* of the first gear motor 331*a* may be inserted into a shaft guide groove 162 formed in the discharge guide 160. Since the first gear shaft 331*c* is inserted into the shaft guide groove 162 having a circular arc shape, the first gear shaft 331*c* may move in the circumferential direction along the shaft guide groove 162 during the rotation of the first gear 331*b*.

The first guide 331 may further include a first bearing 331*d* for allowing the first circulator 300 to easily rotate in the left-right direction. The first bearing 331*d* may be supported in a state of being inserted into a bearing groove 163 formed on the upper side of the discharge guide 160.

Accordingly, a range of left-right rotation angles a1 of the first circulator 300 may be limited by at least one of the shaft guide groove 162 and the bearing groove 163. In this case, a maximum rotation angle a1 of the first circulator 300 may be regulated to about 140 degrees by the shaft guide groove 162 or the bearing groove 163.

By doing so, the first gear motor 331*a* may operate based on a control instruction of a controller 900 described below, and the first circulator 300 may stop at any position in the range of rotation angles a1 or may rotate continuously and repeatedly in a predetermined range of rotation angles a1.

The second guide 332 may include a second gear motor 333*a* generating driving force, and a fixation guide member 333 supporting a second gear 333*b* coupled to an output shaft of the second gear motor 333*a*.

Like the first gear motor 331*a*, the second gear motor 333*a* may be a step motor in which a rotation angle is easily controlled and which rotates in both directions.

The second guide 332 may further include a rotation guide member 334 disposed on an upper side of the fixation guide member 333 and configured to rotate in the up-down direction. The second guide 332 may be coupled to the lower side of the first circulator 300.

The rotation guide member 334 may be provided with a second rack gear 334*a* working with the second gear 333*b*. The second gear 333*b* and the second rack gear 334*a* may have a plurality of gear teeth, and the second rack gear 334*a* and the second gear 333*b* may be gear-coupled through the gear teeth.

Accordingly, when the second gear motor 333*a* is driven through the controller 900 described below, the rotation guide member 334 may make up-down rotations, and as the rotation guide member 334 moves, the first circulator 300 may make up-down rotations, as a result of interworking between the second gear 333*b* and the second rack gear 334*a*.

Figure 8:
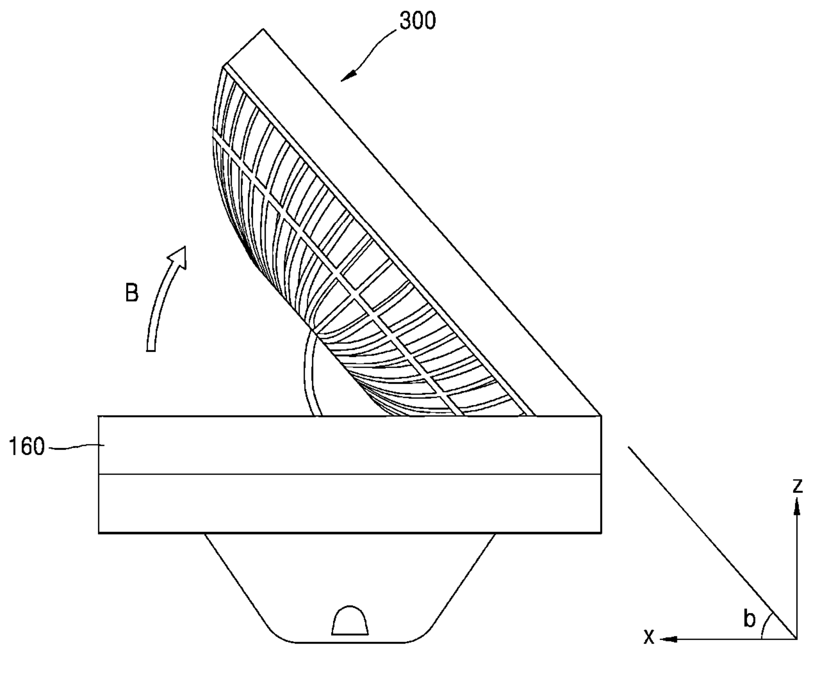
Figure 9:
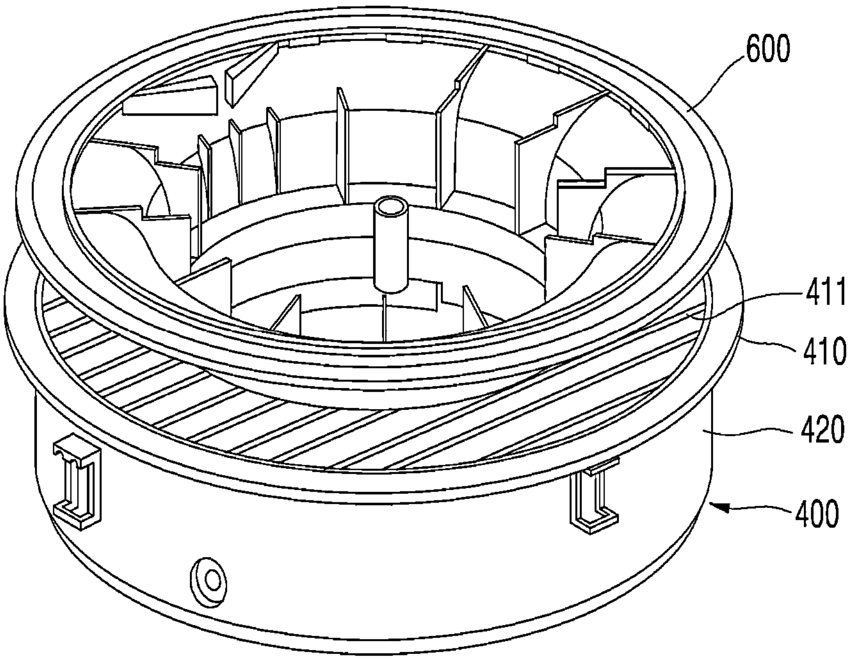
FIG. 9 is a perspective view showing a discharge guide constituting the second circulator in FIG. 3.

By doing so, the first circulator 300 may make upward rotations from the first position to the second position or make downward rotations from the second position to the first position, as illustrated in FIG. 8.

In this case, the first circulator 300 may be fixed to any position between the first position and the second position as a result of control over driving of the second gear motor 333*a* or may rotate between the first position and the second position continuously and repeatedly.

The second position may be configured to have a predetermined slant angle b with respect to the first position, and the slant angle may be about 65 degrees, for example.

The predetermined angle of 65 degrees may be a selected angle such that air is allowed to travel a farthest distance through the first circulator 300 while a predetermined rate or greater of air, perpendicularly discharged from the first air cleaning module 100, flows into the first circulator 300.

When air is blown to at least one sensor hub 20 placed remotely, the slant angle b of the first circulator 300 may remain at 65 degrees, as described below.

A power supply 920, which turns on/off the air cleaner 10 to start and stop operation of the air cleaner 10, an input part 910 receiving a user's instruction for selecting an operation mode, and a display 700 displaying an operation state and the like of the air cleaner 10 may be disposed on an outer surface of an upper side of the first circulator 300, as illustrated in FIG. 6.

In the illustrated embodiment, a position sensing module may be disposed near the power supply 920 and the input part 910 on the outer surface of the upper side of the first circulator 300.

The air cleaner 10, as described below, may sense a position of the sensor hub 20 through the position sensing module, and may change a discharge direction to supply purified air toward the position of the sensor hub 20.

The position sensing module, for example, my include an ultra-wideband module (referred to as "UWB module").

The UWB module 800 may transmit and receive a signal using a wide frequency bandwidth (e.g., 7500 Mhz and the like) at low power and may measure a position of an object to be measured. The UWB module 800 may sense a position and distance of the sensor hub 20 in the state where the first circulator 300 stands at a slant (at the second position) with significantly high sensitivity and accuracy.

Since the UWB module 800 of the air cleaner 10 is attached onto an upper surface of the first circulator 300, a range, in which the air cleaner 10 senses a position of the sensor hub using the UWB module 800, may generally correspond to a range of left-right rotations of the first circulator 300.

The sensor hub 20, described below, may be provided with an additional UWB module 22, to interact with the UWB module 800 of the air cleaner 10 and sense a position of the sensor hub 20.

The air cleaner 10 of the air cleaning system 1 according to the present disclosure may include a second circulator 400 disposed on an upper side of an outlet of the second air cleaning module 200.

Figure 10:
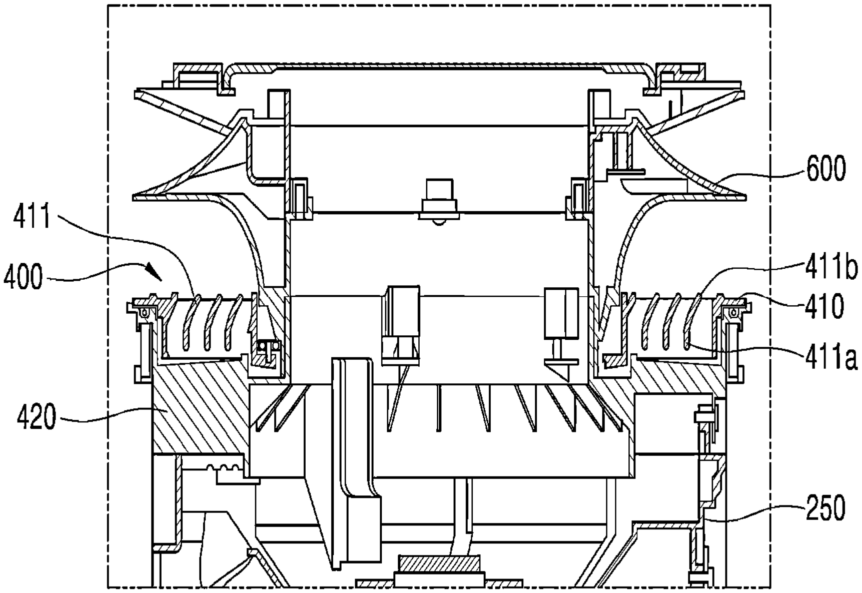
FIG. 10 is a partial cross-sectional view showing the second air cleaning module in FIG. 3.
Figure 11:
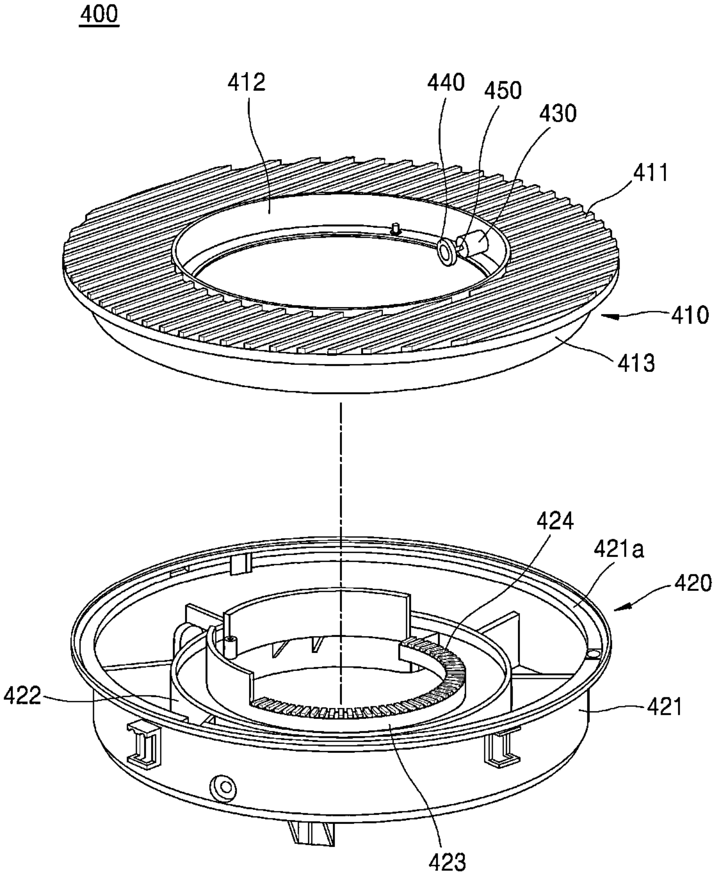
FIG. 11 is an exploded perspective view showing a second circulator.

The second circulator 400, as illustrated in FIGS. 10 and 11, may include a discharge guide 410 rotatably disposed at the outlet of the second air cleaning module 200 and configured to change a discharge direction of air flowing upward, and a discharge body 420 disposed on a lower side of the discharge guide 410 and configured to rotatably support the discharge guide 410.

The discharge guide 410 may include an outer circumferential wall 413 forming an outer circumferential surface, an inner circumferential wall 412 provided in the outer circumferential wall 413 and spaced a predetermined distance apart from the outer circumferential wall, and a plurality of discharge grills 411 disposed between the inner circumferential wall 412 and the outer circumferential wall 413 and configured to change a direction of air flowing upward.

An individual discharge grill 411, as illustrated in FIG. 10, may be provided in the form of a vane. A leading edge 411*a* on a lower side of the discharge grill may be provided in a way that mainly extends downward, and a trailing edge 411*b* on an upper side of the discharge grill may be provided in a way that is bent outward in a radial direction at a predetermined angle with respect to the direction in which the leading edge 411*a* extends.

Accordingly, a flow direction of air introduced to the leading edge 411*a* of the discharge grill 411 may be forcibly changed toward an outside of the discharge grill 411 in a radial direction thereof while passing the trailing edge 411*b*.

The discharge body 420 may form a discharge path of air supplied from the second air blowing fan 230. The discharge path may be formed between an outer body 421 and an inner body 422 having a cylindrical shape respectively. The outlet of the second air cleaning module 200 may be provided between an upper end portion of the outer body 421 and an upper end portion of the inner body 422, in the form of a loop.

Additionally, a mounting portion 421*a* extending outward in the radial direction may be formed in the upper end portion of the outer body 421. The discharge guide 410 may be disposed on an upper side of the mounting portion 421*a*, and the discharge guide 410 may be rotatably supported by the mounting portion 421*a*.

The second circulator 400, as described above, may be configured to change a discharge direction F2 of air discharged from the second air cleaning module 200 into the left direction and the right direction.

To change the discharge direction, the discharge guide 410 may be rotatably supported in an upper end portion of the discharge body 420.

For rotation of the discharge guide 410, a third gear motor 430 may be installed and fixed onto the inner circumferential wall 412 of the discharge guide 410. Like the first gear motor 331*a* and the second gear motor 333*a*, the third gear motor 430 may be a step motor in which a rotation angle is easily controlled and which rotates in both directions.

Additionally, a third gear 440 may be disposed on an output shaft 450 of the third gear motor 430. The third gear 440 may be gear-coupled to a third rack gear 424 of a guide rail 423 described below. Accordingly, when the third gear motor 430 is driven, the third gear 440 may rotate, work with the third rack gear 424 and move in the circumferential direction, along the third rack gear 424 in a fixed state.

The guide rail 423 may be provided in the inner body 422 of the discharge body 420 in the form of a circular arc. In this case, the third rack gear 424 may be formed on an upper surface of the guide rail 423, as illustrated.

In the illustrated embodiment, the third gear motor 430 and the third gear 440 may be disposed at the discharge guide, and the guide rail 423 and the third rack gear 424 may be formed at the discharge body 420, but not limited. In another embodiment, the third gear motor 430 and the third gear 440 may be disposed at the discharge body 420, and the guide rail 423 and the third rack gear 424 may be disposed at the discharge guide 410. Certainly, the modified example is included in a range of the present disclosure. For convenience of description, the illustrated embodiment is described hereunder.

With the above configuration, when power is supplied to the third gear motor 430 through a controller 900 described below, the third gear 440 may rotate in any one direction, and the discharge guide 410 may rotate in any one of the left and right directions based on the gear engagement of the third gear 440 and the third rack gear 424.

When the third gear motor 430 operates according to a control instruction of the controller 900, the discharge guide 410 may stop after rotating to a predetermined position or may rotate continuously and repeatedly in a predetermined range of rotation angles a2. In this case, the predetermined range of rotation angles a2, and the range of left-right rotation angles a1 of the first circulator 300 may be set differently and independently.

With the above configuration of the second circulator 400, a discharge direction F2 of air discharged from the second air cleaning module 200 may be changed and maintained in the direction in which the trailing edge 411*b* of the discharge grill 411 is extended or bent.

Figure 12:
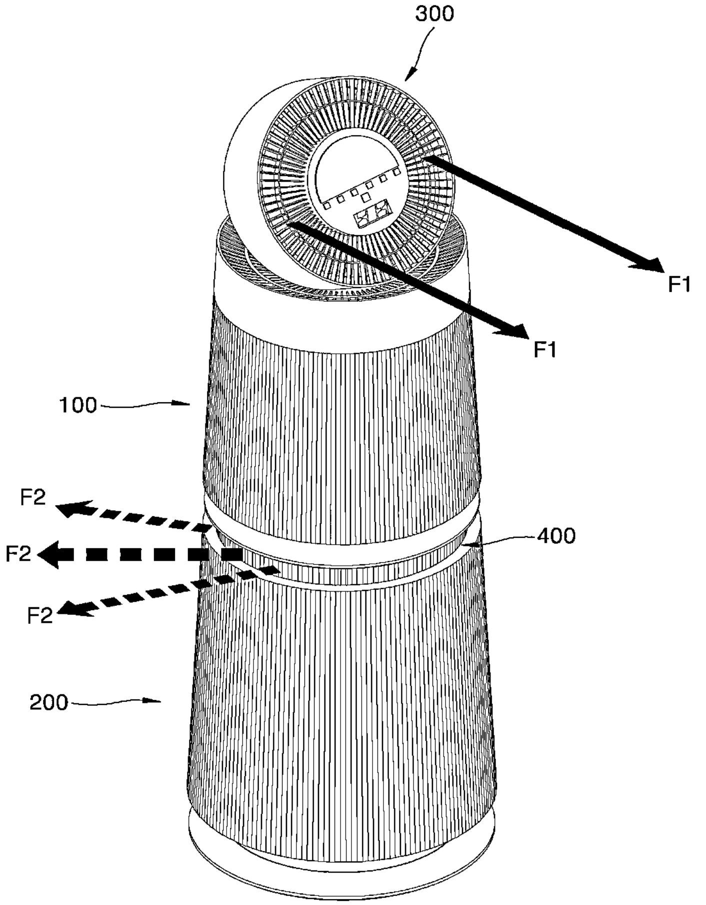
FIG. 12 is a perspective view of an air cleaner for describing air discharge directions by a first circulator and a second circulator.

Further, the discharge direction F2 of the second circulator 400 may be independently controlled as a result of control of the third gear motor 430 regardless of the discharge direction F1 of the first circulator 300, as illustrated in FIG. 12.

Configurations in relation to control over operation of the air cleaning system 1 according to the present disclosure are described hereunder with reference to FIGS. 13 to 19.

Figure 13:
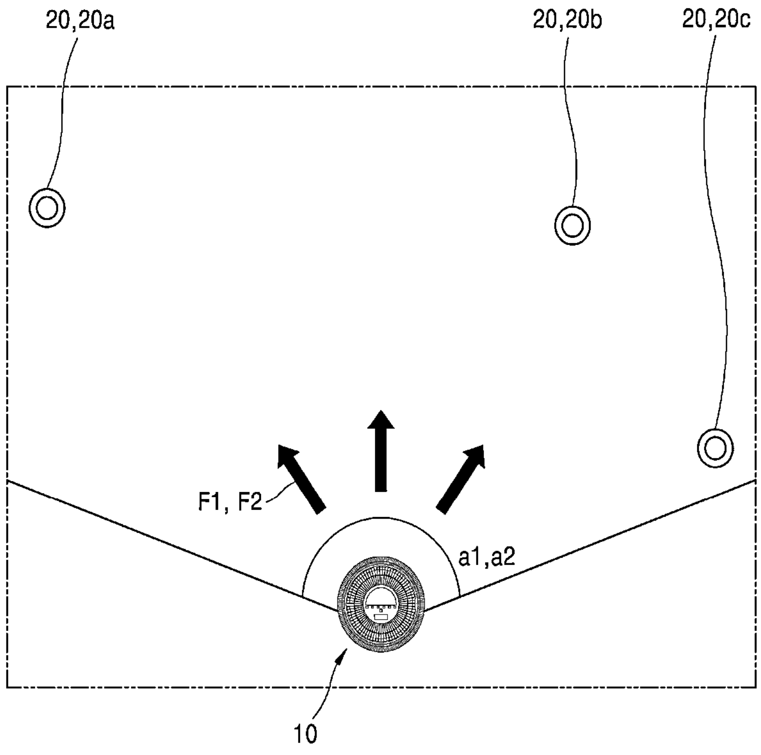
FIG. 13 is a schematic view for describing an alignment relationship between an air cleaner and a plurality of sensor hubs that constitute an air cleaning system according to the present disclosure.

The air cleaner 10 of the air cleaning system 1 according to the present disclosure may operate in an ordinary operation mode in which the air cleaner 10 operates regardless of at least one sensor hub 20, and in a pollution orientation mode in which the air cleaner 10 operates in connection with at least one sensor hub 20, as illustrated in FIG. 13.

The ordinary operation mode may be an operation mode according to a user's instruction for selecting an operation mode input through the above input part 910, and may include an ordinary automatic operation mode and a specific operation mode.

The automatic operation mode may be an operation mode in which an air discharge amount and an air discharge direction are automatically adjusted based on air quality sensed by the dust sensor and the like built into the air cleaner 10 itself.

For example, the automatic operation mode may be set such that the air cleaner 10 operates under the conditions for operation shown in Table 1 below.

TABLE 1

<Conditions for air cleaner 10's operation in automatic operation mode>

| Air cleanliness | First air cleaning module 100 | First circulator 300 | Second air cleaning module 200 and second circulator 400 |
|---|---|---|---|
| Good | Light wind | Off | Light wind<br>Stop rotation |
| Normal | Moderate wind | Moderate wind at slant angle of 0 degree<br>Stop rotation | Moderate wind<br>Stop rotation |
| Poor | Moderate wind | Moderate wind at slant angle of 65 degrees<br>Stop rotation | Moderate wind<br>Stop rotation |
| Very poor | Strong wind | Strong wind at slant angle of 65 degrees Left-right rotation | Strong wind<br>Left-right rotation |

Air cleanliness for the operation conditions may be determined according to the standards in Table 2 below.

TABLE 2

| | | Low | Average | High | Very high |
|---|---|---|---|---|---|
| Odor intensity | | Low | Average | High | Very high |
| Dust concentration | Level | Good | Normal | Poor | Very poor |
| | Fine dust | 30 $\mu g/m^3$ or less | 30~80 $\mu g/m^3$ | 81~150 $\mu g/m^3$ | 151 $\mu g/m^3$ Or greater |
| | Ultrafine/nano dust (PM10/PM2.5) | 15 $\mu g/m^3$ or less | 16~35 $\mu g/m^3$ | 36~75 $\mu g/m^3$ | 75 $\mu g/m^3$ Or greater |
| General air cleanliness | | Good | Normal | Poor | Very poor |

The pollution orientation mode may be an operation mode in which purified air is forcibly blown toward an area where the sensor hub 20 is placed, based on ambient air quality, preferably, a local fine dust concentration sensed by at least one sensor hub 20, while the air cleaner 10 operates in the ordinary operation mode described above, or while the air cleaner 10 is not operating (in a standby mode) in a state in which the power is on.

FIG. 13 shows an example in which three sensor hubs 20*a*, 20*b*, 20*c* are placed in a range of the air cleaner 10's left-right position sensing or in a range of the first circulator 300's left-right rotation angles a1.

The number of the sensor hubs 20 provided may be determined according to users' needs. However, the pollution orientation mode of the air cleaner 10 in connection with the sensor hub 20 may be differently set depending on the number of the sensor hubs 20 and local dust concentrations of ambient air sensed by an individual sensor hub 20.

Figure 14:
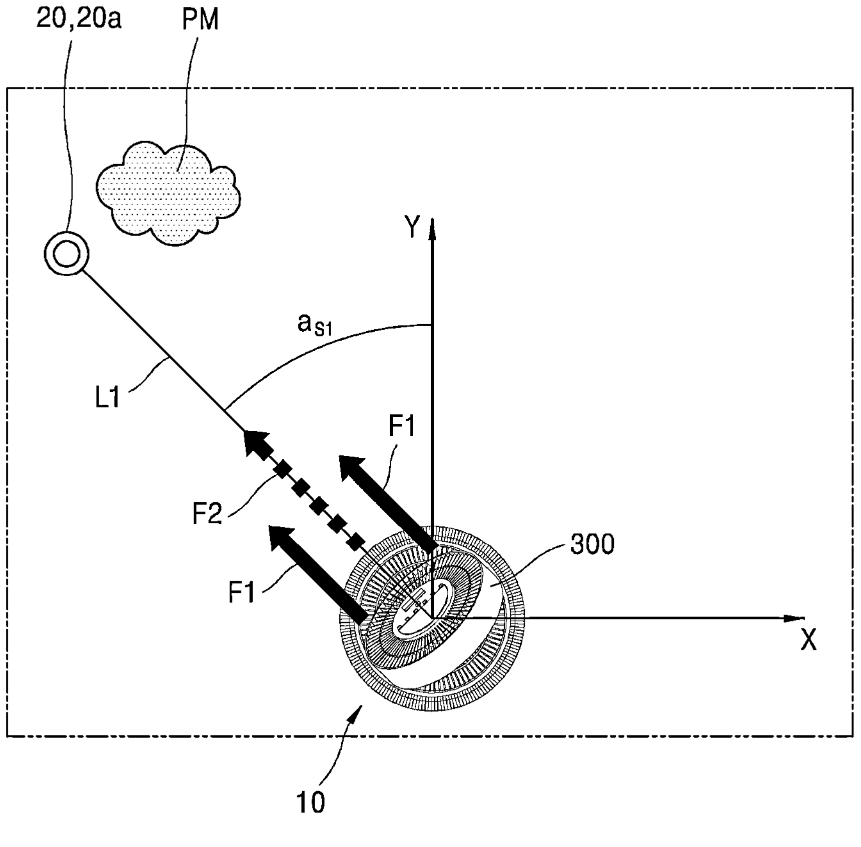
FIG. 14 is a schematic view for describing an air cleaner operating in a first pollution orientation mode.

FIG. 14 shows a first embodiment provided with a single sensor hub 20. For convenience of description, the single sensor hub is referred to as a first sensor hub 20*a*.

The sub dust sensor Sps built into the first sensor hub 20*a* may measure concentrations of fine dust (PM) included in ambient air, and data on first local dust concentrations measured may be transmitted to the air cleaner 10 in real time through the wireless communicator built into the first sensor hub 20*a*.

Objects to be sensed by the first sensor hub 20*a* may be fine dust (PM10) or ultrafine dust (PM2.5) under an air quality standard. The objects to be sensed may be selected by a user.

The air cleaner 10 may receive and store the first local dust concentration data transmitted from the first sensor hub 20*a* in real time.

The air cleaner 10 may measure concentrations of fine dust (PM) included in ambient air using the main dust sensor Spm built into the air cleaner itself and store the measurements as reference dust concentration data.

The main dust sensor Spm and the sub dust sensor Sps may respectively measure a reference dust concentration and a local dust concentration at first time intervals, preferably, at three-second intervals.

The air cleaner 10 may calculate each second time period average of reference dust concentration data and first local dust concentration data that are respectively measured and stored at three-second intervals. The second time period may be 30 seconds, for example.

When the first local dust concentration average exceeds a reference average as a result of comparison of the reference average, calculated by multiplying the calculated reference dust concentration average by a predetermined margin coefficient k, with the calculated first local dust concentration average, occurrence of local pollution around the first sensor hub 20*a* may be determined, and a change in the operation mode of the air cleaner 10 to the pollution orientation mode may be determined.

The predetermined margin coefficient k may be 1.2.

When the change in the operation mode to the pollution orientation mode is determined, the first gear motor 331*a* of the air cleaner 10 may be driven such that the first circulator 300 may rotate in the up-down direction, and accordingly, the first circulator 300's slant angle b may be at 65 degrees, and the second gear motor 333*a* may be driven such that the first circulator 300 may rotate in the left-right direction in the range of the first circulator 300's rotation angles a1.

The first circulator 300 may rotate in the left-right direction to sense a position of the first sensor hub 20*a* using the UWB module 800 disposed on the first circulator 300.

When the position of the first sensor hub 20*a* is sensed through the UWB module 800, a first azimuth as1 and a first distance L1 of the first sensor hub 20*a* may be calculated with respect to the air cleaner 10.

The first azimuth as1, as illustrated, may be defined as an angle formed by a straight line connecting a center of the air cleaner 10 with a center of the first sensor hub 20*a* with respect to the true north direction (a Y-direction).

The first circulator 300 may be fixed to a position of a rotation angle a1 corresponding to the calculated first azimuth as1. Accordingly, an air discharge direction of the first circulator 300 may be fixed in a direction toward the first sensor hub 20*a*.

When the air discharge direction of the first circulator 300 is determined, or at the same time as the air discharge direction of the first circulator 300 is determined, the third fan motor 320 may be driven such that air is discharged at a strong wind level in the automatic operation mode is discharged.

Additionally, the second fan motor 240 may be driven such that the second circulator 400 discharges air at the strong wind level in the automatic operation mode.

Like the discharge direction of the first circulator 300, a discharge direction F2 of the second circulator 400 may be fixed to a position of a rotation angle a2 corresponding to the first azimuth as1 as a result of driving of the third gear motor 430. Accordingly, air discharged from the first circulator 300 and the second circulator 400 may all be oriented toward the first sensor hub 20*a*.

The first fan motor 140 of the first air cleaning module 100 may be driven according to a standard of the above automatic operation mode depending on air quality around the air cleaner 10 regardless of the pollution orientation mode.

Operation in the pollution orientation mode may continue until predetermined conditions are satisfied. That is, second time period averages may be calculated again, described above, based on local dust concentration data and reference dust concentration data that are received again while the operation in the pollution orientation mode continues, and the calculated reference average and the calculated local dust concentration average may be compared again.

When the local dust concentration average is less than or the same as the calculated reference average, it may be determined that a degree of local fine dust generation in an area, where the first sensor hub 20*a* is placed, is reduced to that of the main body. Accordingly, the operation in the pollution orientation mode may finish, and the operation mode may automatically change into the ordinary operation mode.

Regardless of the change into the pollution orientation mode and the operation in the pollution orientation mode described above, an amount of a change in first local dust concentration data received from the first sensor hub 20*a* may be measured to determine whether air quality around the first sensor hub 20*a* is rapidly deteriorating, and results of the determination may be informed to a user.

That is, a first deviation (ΔD1) of first local dust concentration data received at the above first time intervals, and the square of the deviation (ΔD1) may be added for a third time period longer than the above second time period. In this case, it is determined whether a third time period first deviation average (ΔD1_av) of the added squares exceeds a predetermined threshold value.

For example, the third time period may be one minute, and the predetermined threshold value may be 100.

When the calculated first deviation average (ΔD1_av) exceeds the predetermined threshold value, a voice alarm or a sound alarm, indicating that air quality around the first sensor hub 20*a* is rapidly deteriorating, may be generated through a sound output part 940 disposed in the air cleaner 10.

For example, the generated voice alarm may include an alarm phrase such as "Indoor air pollution levels are rapidly increasing. Ventilation is encouraged."

Figure 21:
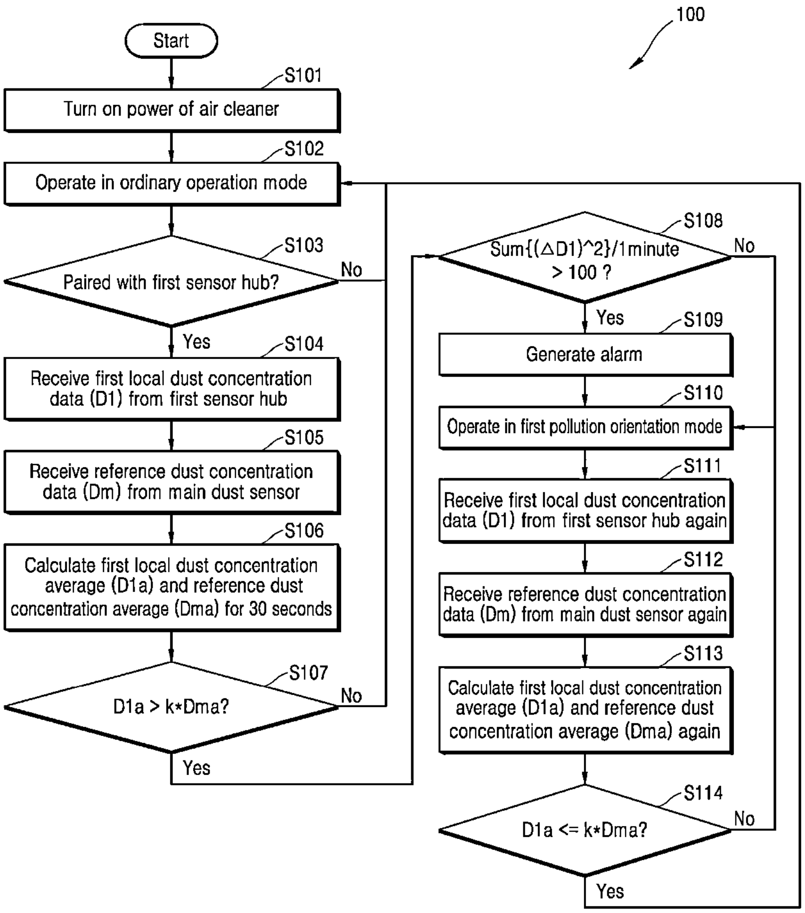
FIGS. 21 to 22 are flow charts for describing a control method of an air cleaner according to a first embodiment.
Figure 22:
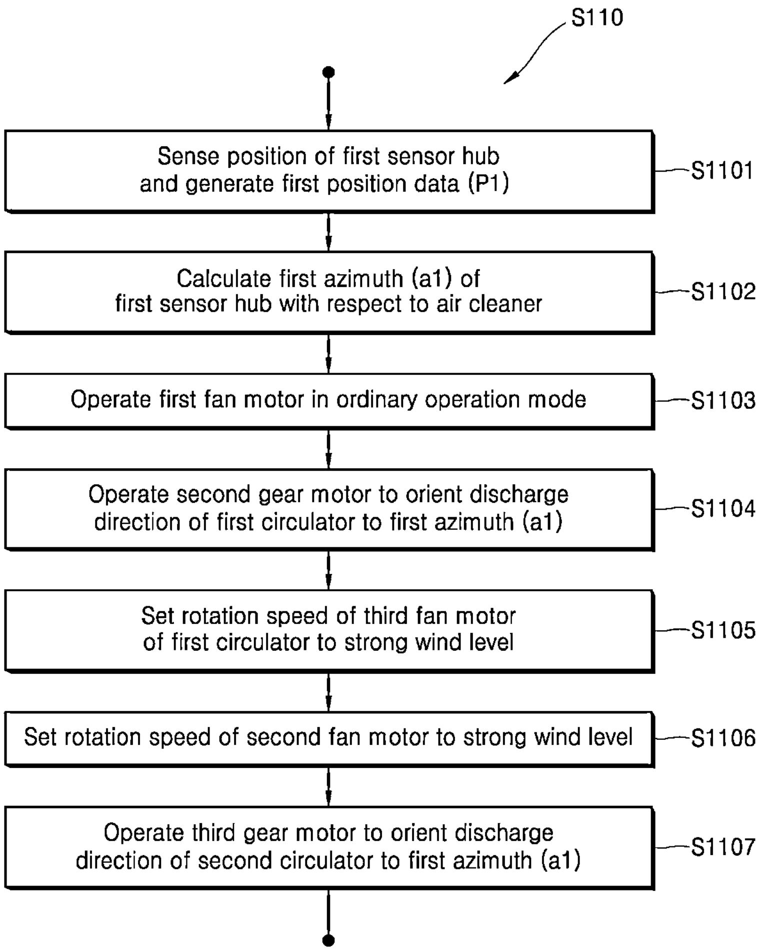

A control method of the first embodiment by the controller 900 of the air cleaner 10 is specifically described hereunder with reference to FIGS. 21 and 22.

Figure 15:
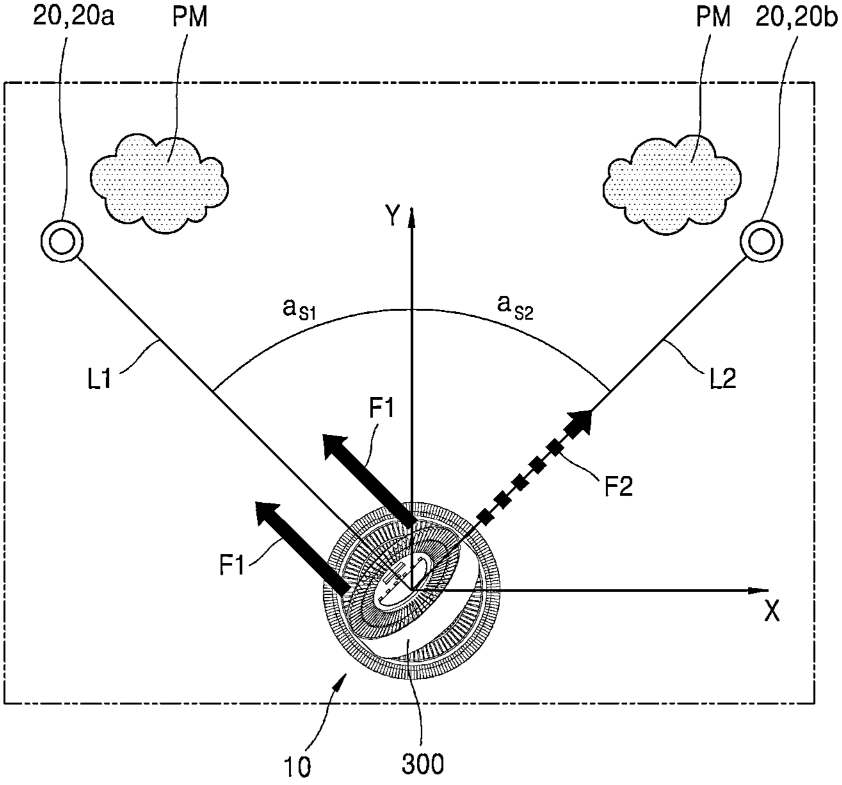
FIGS. 15 and 16 is a schematic view for describing an air cleaner operating in a second pollution orientation mode.
Figure 16:
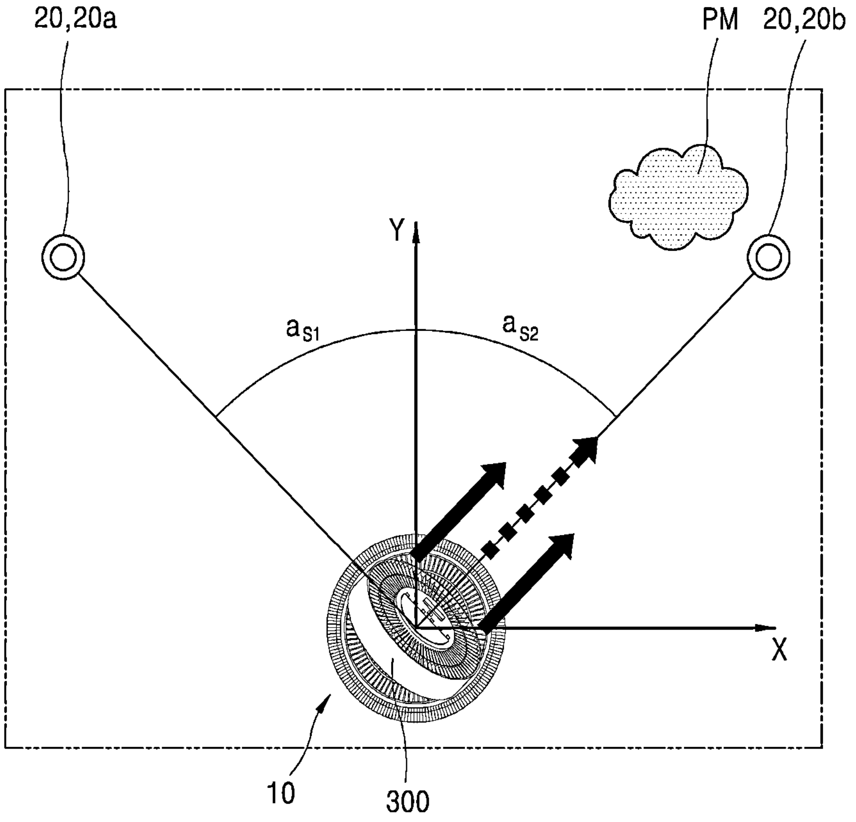

FIGS. 15 and 16 show a second embodiment provided with two sensor hubs. For convenience of description, the two sensor hubs are respectively referred to as a first sensor hub 20*a*, and a second sensor hub 20*b*.

The second embodiment is the same as the first embodiment except that the second sensor hub 20*b* is provided in addition to the first sensor hub 20*b*. The standards for determining a change into the pollution orientation mode and for generating a voice alarm/sound alarm, described with reference to the first embodiment, may also be applied to the second embodiment. For convenience of description, differences between the first embodiment and the second embodiment are described hereunder.

The first sensor hub 20*a* and the second sensor hub 20*b*, spaced apart from each other, may measure local dust concentrations of ambient air independently and respectively at first time intervals, and dust concentration data may be respectively transmitted to the air cleaner 10 through each wireless communicator in real time. To distinguish the data, dust concentration data, transmitted to the first sensor hub 20*a*, are referred to as first local dust concentration data, and dust concentration data, transmitted to the second sensor hub 20*b*, are referred to as second local dust concentration data.

A first local dust concentration average and a second local dust concentration average may be calculated as a second time period average for received first local dust concentration data and second local dust concentration data.

As in the first embodiment, a reference dust concentration average may be calculated using data on reference dust concentrations measured by a main dust sensor Spm, and the calculated dust concentration average may be compared respectively with the first local dust concentration average and the second local dust concentration average.

When any one of the first local dust concentration average and the second local dust concentration average exceeds the reference dust concentration average as a result of comparison, occurrence of local pollution around the first sensor hub 20*a* or the second sensor hub 20*b* may be determined, and the operation mode of the air cleaner 10 may change to the pollution orientation mode.

In this case, the pollution orientation mode may be performed under almost the same operation conditions as the first embodiment. However, depending on whether the first local dust concentration average and the second local dust concentration average all exceed the reference dust concentration average, that is, whether air around the first sensor hub and air around the second sensor hub all need to be purified, the operation mode may differ.

FIG. 15 shows a state in which the first local dust concentration average and the second local dust concentration average all exceed the reference dust concentration average.

In this case, purified air needs to be supplied toward both of the first sensor hub 20*a* and the second sensor hub 20*b* in a concentrated manner through a first circulator 300 and a second circulator 400 of the air cleaner 10.

However, directions oriented by the first circulator 300 and the second circulator 400 may vary depending on a first distance L1 from the air cleaner 10 to the first sensor hub 20*a* and a second distance L2 from the air cleaner 10 to the second sensor hub 20*b*.

That is, when of the first distance L1 and the second distance L2 directly and indirectly measured by a UWB module 800 of the air cleaner 10 from the position of the first sensor hub 20*a* and from the position of the second sensor hub 20*b*, the first distance L1 is greater than the second distance L2, the first circulator 300 may be oriented toward the first sensor hub 20*a*, and the second circulator 400 may be oriented toward the second sensor hub 20*b*.

That is, as illustrated in FIG. 15, the first circulator 300 generating a relatively large air discharge amount may be oriented toward the first sensor hub 20*a* at a relatively far distance, and the second circulator 400 may be oriented toward the second sensor hub 20*b* at a relatively close distance. Accordingly, purification efficiency of air around the first sensor hub 20*a* and the second sensor hub 20*b* may improve, and time taken for purifying air around the first sensor hub and the second hub may be reduced.

For the same reason, when the second distance L2 is greater than the first distance L1, the first circulator 300 may be oriented toward the second sensor hub 20*b*, and the second circulator 400 may be oriented toward the first sensor hub 20*a*.

FIG. 16 shows a state in which of the first local dust concentration average and the second local dust concentration average, the second local dust concentration average exceeds the reference dust concentration average.

In this case, purified air needs to be supplied to air around the second sensor hub 20*b* in a concentrated manner through the air cleaner 10. Accordingly, each discharge direction (F1 and F2) of both the first circulator 300 and the second circulator 400 may be changed toward the second sensor hub 20*b*.

The configuration of the operation in the pollution orientation mode toward the second sensor hub 20*b* is the same as that of the first embodiment except for an object to be oriented. Accordingly, description in relation to the configuration is omitted.

Figure 23:
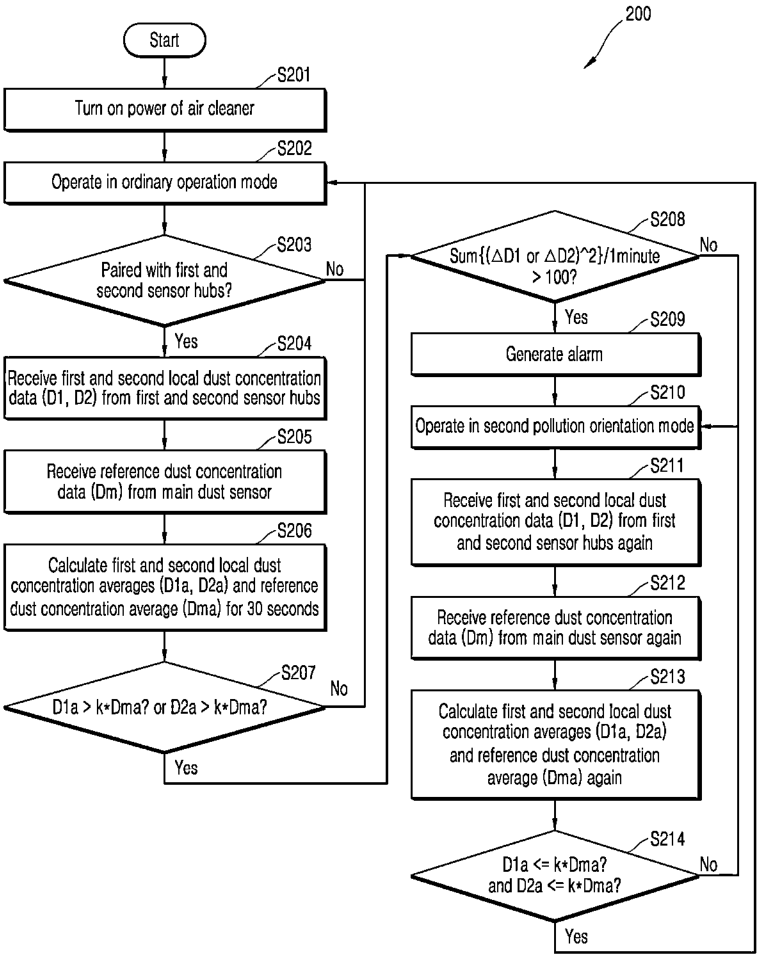
FIGS. 23 to 27 are flow charts for describing a control method of an air cleaner according to a second embodiment.
Figure 24:
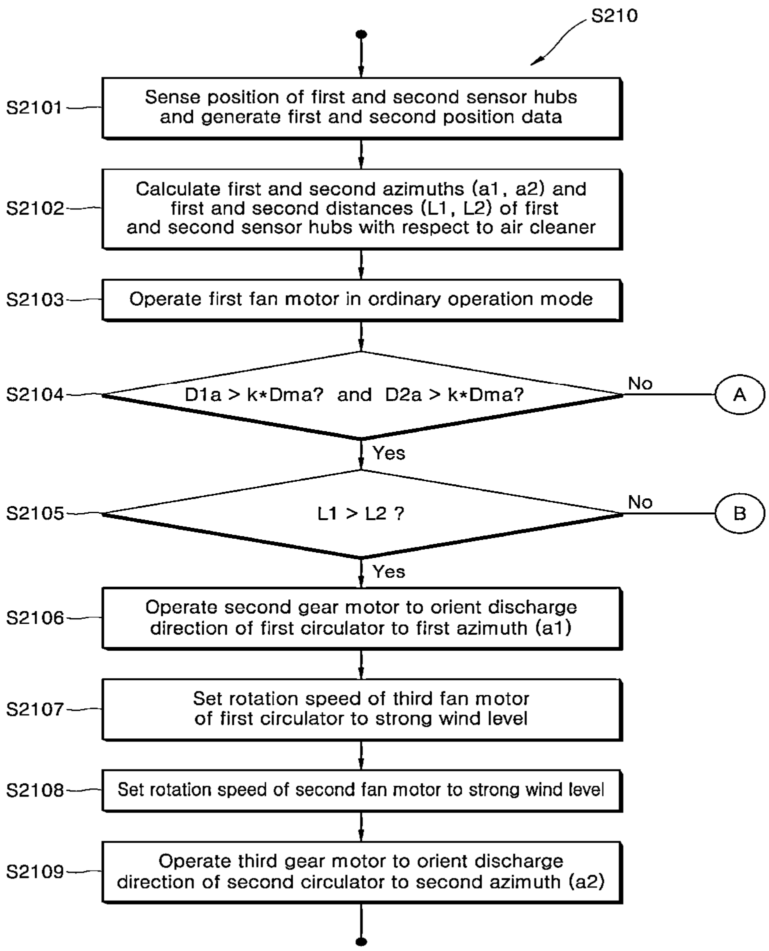
Figure 25:
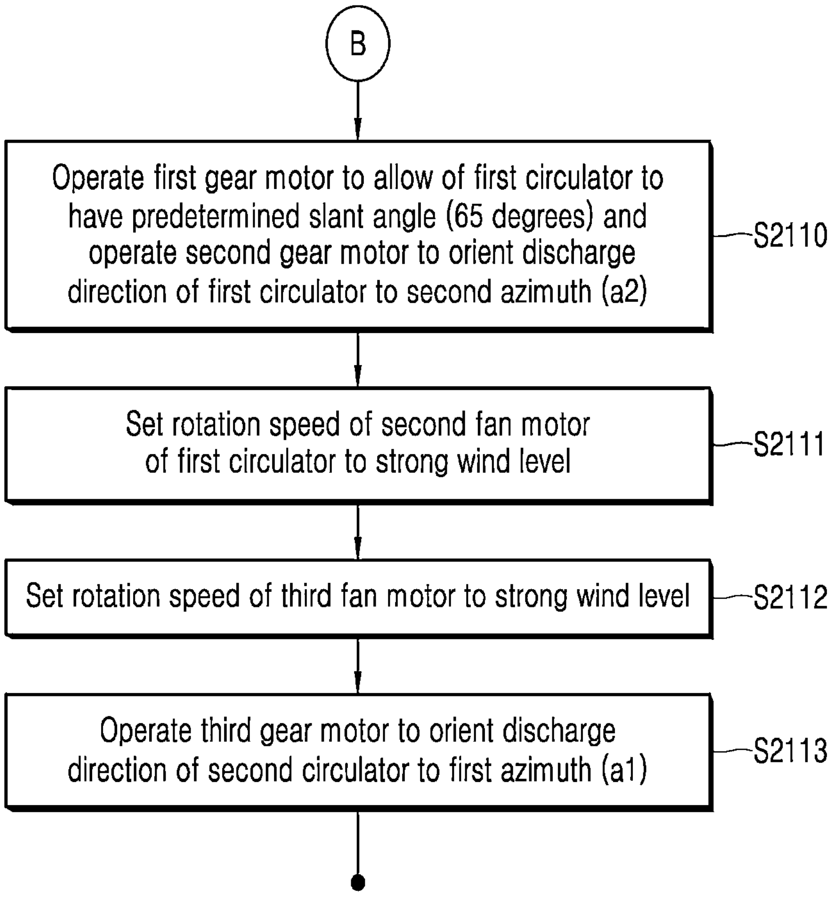

A control method of the second embodiment by the controller 900 of the air cleaner 10 is specifically described hereunder with reference to FIGS. 23 to 25.

Figure 17:
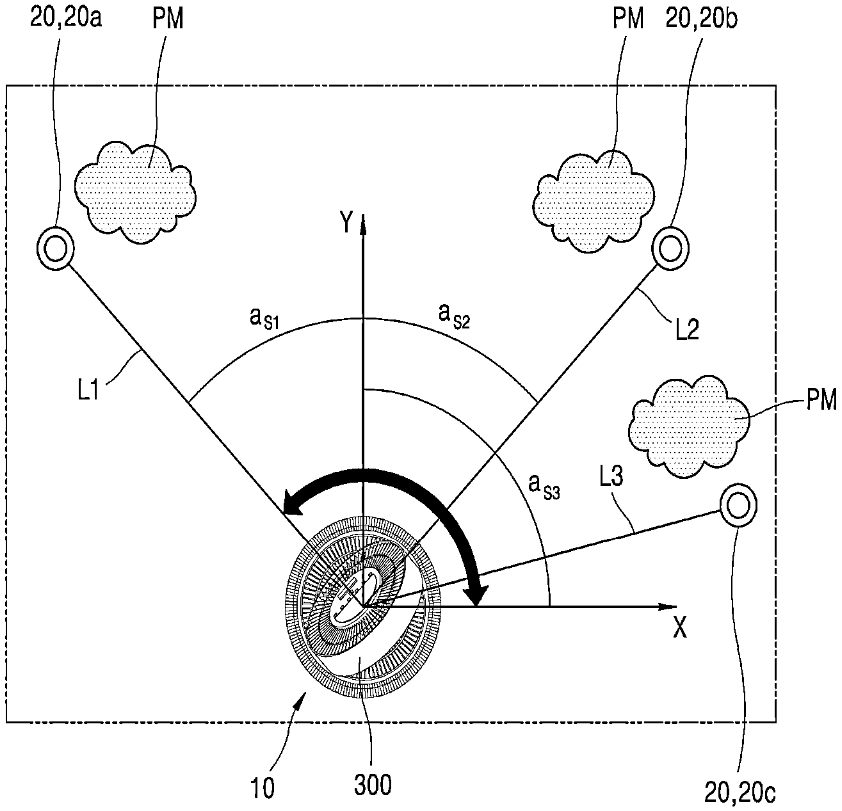
FIGS. 17 to 19 are schematic views for describing an air cleaner operating in a third pollution orientation mode.
Figure 18:
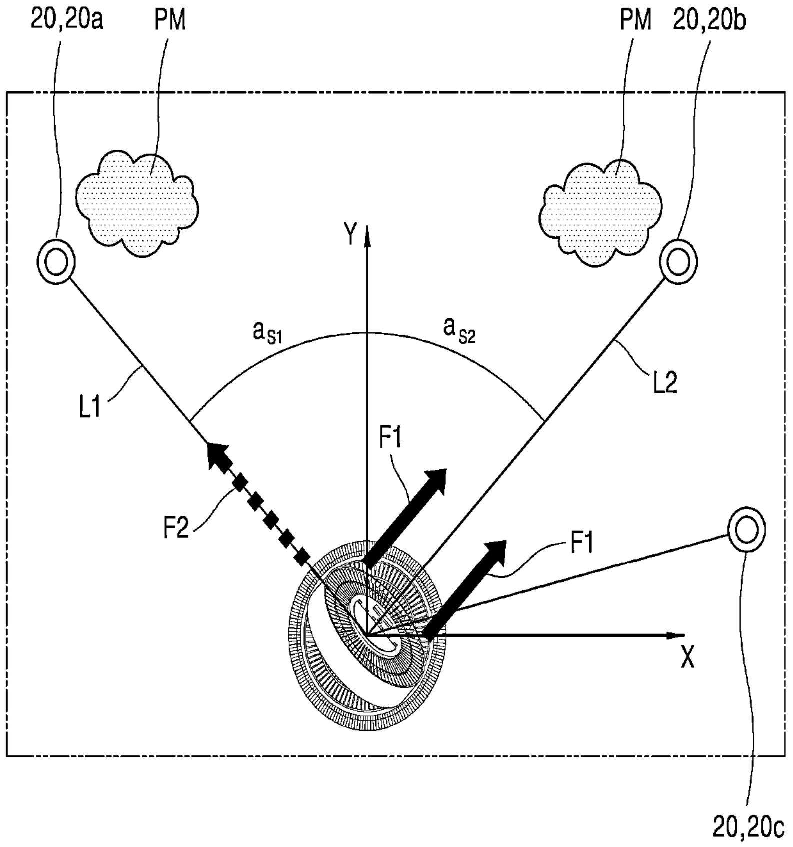
Figure 19:
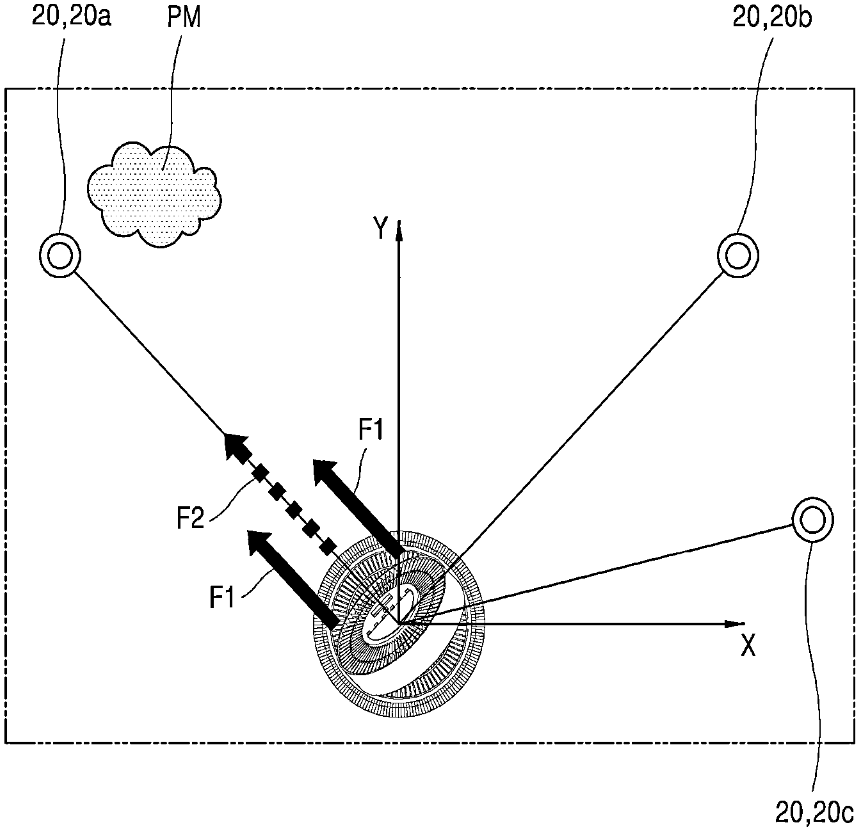

FIGS. 17 to 19 show a third embodiment provided with three sensor hubs. For convenience of description, the three sensor hubs are respectively referred to as a first sensor hub 20*a*, a second sensor hub 20*b*, and a third sensor hub 20*c*.

The third embodiment is the same as the first embodiment and the second embodiment except that the third sensor hub 20*c* is provided in addition to the first sensor hub 20*a* and the second sensor hub 20*b*. The standards for determining a change into the pollution orientation mode and for generating a voice alarm/sound alarm, described with reference to the first embodiment and the second embodiment, may also be applied to the third embodiment. For convenience of description, differences between the third embodiment, and the first embodiment and the second embodiment are described hereunder.

The first sensor hub 20*a*, the second sensor hub 20*b* and the third sensor hub 20*c*, spaced apart from one another, may measure local dust concentrations of ambient air independently and respectively at first time intervals, and dust concentration data may be respectively transmitted to the air cleaner 10 through each wireless communicator in real time.

To distinguish the data, dust concentration data, transmitted to the first sensor hub 20*a*, are referred to as first local dust concentration data, and dust concentration data, transmitted to the second sensor hub 20*b*, are referred to as second local dust concentration data, and dust concentration data, transmitted to the third sensor hub 20*c*, are referred to as third local dust concentration data.

A first local dust concentration average, a second local dust concentration average and a third local dust concentration average may be calculated as a second time period average for received first local dust concentration data, second local dust concentration data and third local dust concentration data.

As in the first embodiment and the second embodiment, a reference dust concentration average may be calculated using data on reference dust concentrations measured by a main dust sensor Spm, and the calculated dust concentration average may be compared respectively with the first local dust concentration average, the second local dust concentration average and the third local dust concentration average.

When any one of the first local dust concentration average, the second local dust concentration average and the third local dust concentration average exceeds the reference dust concentration average as a result of comparison, occurrence of local pollution around any one of the first sensor hub to the third sensor hub 20*a*, 20*b*, 20*c* may be determined, and the operation mode of the air cleaner 10 may change to the pollution orientation mode.

In this case, the pollution orientation mode may be performed under almost the same operation conditions as the first embodiment and the second embodiment. However, depending on whether the first local dust concentration average, the second local dust concentration average and the third local dust concentration average all exceed the reference dust concentration average, that is, whether air around the first sensor hub and air around the second sensor hub and the third sensor hub all need to be purified, the operation mode may differ.

FIG. 17 shows a state in which the first local dust concentration average, the second local dust concentration average and the third local dust concentration average all exceed the reference dust concentration average.

In this case, local pollution may occur to all of the first sensor hub 20*a*, the second sensor hub 20*b* and the third sensor hub 20*c*, and purified air needs to be supplied toward all of the first sensor hub 20*a*, the second sensor hub 20*b* and the third sensor hub 20*c* in a concentrated manner through a first circulator 300 and a second circulator 400 of the air cleaner 10.

However, the air cleaner 10 may supply purified air only through the first circulator 300 and the second circulator 400 in a concentrated manner. Accordingly, air may not be efficiently supplied to the first sensor hub to the third sensor hub 20*a*, 20*b*, 20*c* at the same time.

To supply purified air to the first sensor hub to the third sensor hub 20*a*, 20*b*, 20*c* consecutively and repeatedly, the first circulator 300 and the second circulator 400 of the air cleaner 10 may be configured to be rotated and driven continuously and repeatedly in a range of rotation angles determined among a first azimuth as1 with respect to the first sensor hub 20*a* to a third azimuth as3 with respect to the third sensor hub 20*c*.

Accordingly, purification efficiency of air around the first sensor hub to the third sensor hub 20*a*, 20*b*, 20*c* may improve and time taken for purifying air around the first sensor hub to the third sensor hub may be reduced since purified air is evenly supplied to the first sensor hub to the third sensor hub 20*a*, 20*b*, 20*c*.

When the first local dust concentration average and the second local dust concentration average, measured through the first sensor hub 20*a* and the second sensor hub 20*b* among the three sensor hubs, exceed the reference average, as illustrated in FIG. 18, it is the same situation as in the second embodiment illustrated in FIG. 15.

In this case, the pollution orientation mode may be performed in the same way as the second embodiment in FIG. 15. Description in relation to this is omitted.

Additionally, when the first local dust concentration average, measured through the first sensor hub 20*a* among the three sensor hubs, exceeds the reference average as illustrated in FIG. 19, it is the same situation as in the first embodiment illustrated in FIG. 14.

In this case, the pollution orientation mode may be performed in the same way as the first embodiment in FIG. 14. Description in relation to this is omitted.

A control method of the third embodiment by the controller 900 of the air cleaner 10 is specifically described hereunder with reference to FIGS. 28 to 32.

Below, configurations of a controller 900 of the air cleaner 10 and the sensor hub 20 of the air cleaning system 1 according to the present disclosure are described.

The air cleaner 10, as illustrated in FIG. 20, may include a controller 900 for controlling each function and configuration.

The controller 900 may electrically connect to the first fan motor 140 adjusting an air discharge amount of the first air cleaning module 100, and the second fan motor 240 adjusting an air discharge amount of the second air cleaning module 200. The controller 900 may independently and respectively control the air discharge amount of the first air cleaning module 100 and the second air cleaning module 200 as a result control over power supplied to the first fan motor 140 and the second fan motor 240.

Additionally, the controller 900 may electrically connect to the third fan motor 320 controlling an air discharge amount of the first circulator 300, the first gear motor 331*a* adjusting a left-right rotation angle a1 of the first circulator 300, and the second gear motor 333*a* adjusting an up-down slant angle b of the first circulator 300. The controller 900 may adjust the air discharge amount of the first circulator 300 as a result of control of power supplied to the third fan motor 320, and may control the up-down slant angle b and the left-right rotation angle a1 of the first circulator 300 independently and respectively as a result of supply of power to the first gear motor 331*a* and the second gear motor 333*a*.

Further, the controller 900 may electrically connect to the wireless communicator 950 and the UWB module 800. The controller 900 may transmit data to the sensor hub 20 and receive data from the sensor hub 20 through the wireless communicator 950, and may sense a position of the sensor hub 20 and calculate an azimuth and a distance with respect to the sensor hub 20 through the UWB module 800.

Further, the controller 900 may electrically connect to the power supply 920, the input part 910 and the display 700. The controller 900 may receive a user's on/off instruction and a user's instruction for selecting an operation mode through the power supply 920 and the input part 910, and may display a current operation mode and the like of the air cleaner 10 through the display 700.

Further, the controller 900 may electrically connect to the main dust sensor Spm. The controller 900 may receive reference dust concentration data from the main dust sensor Spm, calculate an average of the received reference dust concentration data and determine whether to change an operation mode.

Furthermore, the controller 900 may electrically connect to the memory 930. The controller 900 may call operation conditions for each operation mode, prestored in the memory 930, and using the operation conditions, may generate a control signal for controlling the air cleaner 10 described above.

The controller 900 may electrically connect to the sound output part 940. When an alarm voice or an alarm sound needs to be generated as described above, the controller 900 may generate a control signal for allowing the sound output part 940 to generate an alarm.

Additionally, the sub dust sensor Sps, a humidity sensor Sh, a temperature sensor St, a voice sensor Ss and other sensors as a means to measure ambient air quality may electrically connect to a controller 21 of the sensor hub 20. Data measured through the sensors may be transmitted to a user terminal or the controller 900 of the air cleaner 10 through a wireless communicator 23. Since local dust concentration data generated through the sub dust sensor Sps may be used as a basis for determining whether to change into a pollution orientation mode, the data may be directly delivered to the air cleaner 10 through the wireless communicator 23.

The controller 21 of the sensor hub 20 may electrically connect to the power supply 25 supplied with a user's on/off instruction and power, and the memory 24 in which conditions for operation of the sensor hub 20 and the like are stored.

Additionally, the sensor hub 20 may further include an additional UWB module 22 configured to communicate with the UWB module 800 of the air cleaner 10, to sense a position.

Below, steps in a control method of the air cleaning system 1 according to the present disclosure are described with reference to FIGS. 21 to 32.

First, a control method (S100) of the air cleaning system 1 according to the first embodiment illustrated in FIG. 14 is described with reference to FIGS. 21 and 22.

The controller 900 of the air cleaner 10 may start to operate the air cleaner 10 in the ordinary operation mode described above when power is on through the power supply 920. (S101 and S102)

The above ordinary operation mode may be an operation mode according to a user's instruction for selecting an operation mode input through the input part 910 described above, and may include an ordinary automatic operation mode and a specific operation mode.

Then the controller 900 may confirm whether the controller 900 connects to the first sensor hub 20*a* in a communicable manner through the wireless communicator 950, that is, whether the controller is paired with the first sensor hub 20*a*. (S103)

In step 103, when confirming non-pairing with the first sensor hub 20*a*, the controller may continue to operate in the ordinary operation mode (S102).

When confirming paring with the first sensor hub 20*a* in step 103, the controller 900 may receive first local dust concentration data, measured at the first time intervals, from the first sensor hub 20*a* through the wireless communicator 950 and store the data in the memory 930. (S104)

Then the controller 900 may receive reference dust concentration data measured at the first time intervals through the main dust sensor Spm and store the data in the memory 930. (S105)

In this case, the first sensor hub 20*a* and the main dust sensor Spm may measure a concentration of fine dust or ultrafine dust that is respectively PM10 or PM2.5 under an air quality standard. The first time interval may be three seconds.

Then the controller 900 may calculate each second time period average of the reference dust concentration data and the first local dust concentration data that are respectively measured and stored at the first time intervals. (S106)

The second time period may be 30 seconds, for example.

Then the controller 900 may compare a reference average, calculated by multiplying the calculated reference dust concentration average by a predetermined margin coefficient k, with the calculated first local dust concentration average, and may determine whether the first local dust concentration average exceeds the reference average. (S107)

The predetermined margin coefficient k may be 1.2.

When the first local dust concentration average is less than or the same as the reference average as a result of determination in step 107, the controller may proceed with step 102 and continue to operate in the ordinary operation mode (S102).

When the first local dust concentration average exceeds the reference average as a result of determination in step 107, the controller may change the operation mode from the ordinary operation mode to a first pollution orientation mode. (S110)

However, regardless of/in addition to the step of changing into the first pollution orientation mode (S110), the controller 900 may add first deviations ($\Delta D1$) of the first local dust concentration data, received at the first time intervals, and squares of the deviations ($\Delta D1$) for a third time period longer than the second time period, and may determine whether a third time period first deviation average ($\Delta D1\_av$) of the added squares exceeds a predetermined threshold value. (S108)

For example, the third time period may be one minute, and the predetermined threshold value may be 100.

When determining the first deviation average ($\Delta D1\_av$) exceeds the predetermined threshold value in step 108, the controller 900 may control the sound output part 940 disposed in the air cleaner 10 such that the sound output part generates a voice alarm or a sound alarm indicating that air quality around the first sensor hub 20*a* is rapidly deteriorating. (S108)

For example, the generated voice alarm may include an alarm phrase such as "Indoor air pollution levels are rapidly increasing. Ventilation is encouraged."

The step of changing into the first pollution orientation mode (S110) may include detailed steps as illustrated in FIG. 22.

Referring to FIG. 22, the controller 900 may rotate the first circulator 300 in the up-down direction by driving the first gear motor 331*a* of the air cleaner 10 such that the first circulator 300's slant angle b is at 65 degrees, sense a position of the first sensor hub 20*a* using the UWB module 800 while rotating the first circulator 300 in the left-right direction in the range of rotation angles a1 by driving the second gear motor 333*a*, and generate first position data of the first sensor hub 20*a*. (S1101)

When the first position data are generated, the controller 900 may calculate a first azimuth as1 and a first distance L1 of the first sensor hub 20*a* with respect to the air cleaner 10 based on the first position data. (S1102)

Then the controller 900 may drive the first fan motor 140 of the first air cleaning module 100 in the above ordinary operation mode. (S1103) That is, the first fan motor 140 may be controlled to operate in the ordinary automatic operation mode and the specific operation mode regardless of the pollution orientation mode.

Then the controller 900 may drive the second gear motor 333*a* of the first circulator 300 to move the first circulator 300 in the left-right direction such that the discharge direction F1 of the first circulator 300 is oriented to a position of a rotation angle a1 corresponding to the first azimuth as1 calculated in step S1102. (S1104). Accordingly, the air discharge direction of the first circulator 300 may be oriented and fixed to the first sensor hub 20*a*.

When the left-right movement of the first circulator 300 is completed in step 1104, the controller 900 may drive the third fan motor 320 such that air is discharged from the first circulator 300 at a strong wind level. (S1105)

Additionally, the controller 900 may drive the second fan motor 240 such that air is discharged from the second circulator 400 at a strong wind level in the automatic operation mode. (S1106)

As described regarding the air discharge direction of the first circulator 300, the controller 900 may drive the third gear motor 430 to rotate the first circulator 300 such that the second circulator 400 is oriented to a position of a rotation angle a2 corresponding to the first azimuth as1. (S1107) Accordingly, the air discharge direction of the first circulator 300 may be oriented and fixed to the first sensor hub 20*a*.

When the change into the first pollution orientation mode is completed through the steps, the controller 900, as illustrated in FIG. 21, may determine a degree of local fine dust generation around the first sensor hub 20*a* again while continuing to operate in the pollution orientation mode.

That is, the controller 900 may receive first local dust concentration data and reference dust concentration data, measured at the first time intervals, again while continuing to operate in the pollution orientation mode. (S111)

Additionally, the controller 900 may recalculate second time period reference average and second time period first local dust concentration average, as described above, using the first local dust concentration data and reference dust concentration data received again, and may compare the recalculated reference average and the recalculated first local dust concentration average again. (S112 and S113)

When the recalculated first local dust concentration average is smaller than or the same as the recalculated reference average as a result of comparison in step 113, the operation in the first pollution orientation mode may finish, and the operation mode may change into the above ordinary operation mode in step 102.

That is, it may be determined that the degree of local fine dust generation in an area where the first sensor hub 20*a* is placed is reduced to that of the main body as a result of operation in the first pollution orientation mode. Accordingly, the operation in the pollution orientation mode may finish, and the operation mode may automatically change into the ordinary operation mode.

When the recalculated first local dust concentration average is greater than the recalculated reference average as a result of comparison in step 113, the controller may proceed with step 110, and the air cleaner 10 may continue to operate in the first pollution orientation mode.

Below, a control method (S200) of the air cleaning system 1 according to the second embodiment, illustrated in FIGS. 15 and 16, is described with reference to FIGS. 23 and 27.

As described regarding the control method (S100) of the air cleaning system 1 according to the first embodiment, the controller 900 of the air cleaner 10 may start to operate the air cleaner 10 in the ordinary operation mode described above when power is on through the power supply 920. (S201 and S202)

Then the controller 900 may confirm whether the controller 900 connects to the first sensor hub 20*a* and the second sensor hub 20*b* in a communicable manner through the wireless communicator 950, that is, whether the controller is paired with the first sensor hub 20*a* and the second sensor hub 20*b*. (S203)

In step 203, when confirming non-pairing with the first sensor hub 20*a* and the second sensor hub 20*b*, the controller 900 may continue the operation in the ordinary operation mode (S202).

When confirming paring with the first sensor hub 20*a* and the second sensor hub 20*b* in step 203, the controller 900 may receive first local dust concentration data and second local dust concentration data, measured at the first time intervals, from the first sensor hub 20*a* and the second sensor hub 20*b* through the wireless communicator 950 and store the data in the memory 930. (S204)

Then the controller 900 may receive reference dust concentration data measured at the first time intervals through the main dust sensor Spm and store the data in the memory 930. (S205)

Then the controller 900 may calculate each second time period average of the reference dust concentration data and the first local dust concentration data and the second local dust concentration data that are respectively measured and stored at the first time intervals. (S206)

Then the controller 900 may compare a reference average, calculated by multiplying the calculated reference dust concentration average by a predetermined margin coefficient k, with the calculated first local dust concentration average and the calculated second local dust concentration average, and may determine whether the first local dust concentration average and the second local dust concentration average exceed the reference average. (S207)

When the first local dust concentration average and the second local dust concentration average are all less than or the same as the reference average as a result of determination in step 207, the controller may proceed with step 202 and continue the operation in the ordinary operation mode.

When at least one of the first local dust concentration average and the second local dust concentration average exceeds the reference average as a result of determination in step 207, the controller may change the operation mode from the ordinary operation mode to a second pollution orientation mode. (S210)

As described regarding the control method (S100) of the air cleaning system 1 according to the first embodiment, regardless of/in addition to the step of changing into the second pollution orientation mode (S210), the controller 900 may add deviations (ΔD1 or ΔD2) of the first local dust concentration data or the second local dust concentration data, received at the first time intervals, and squares of the deviations (ΔD1 and ΔD2) for a third time period, and may determine whether any one of third time period deviation averages (ΔD1_av and ΔD2_av) of the added squares exceeds a predetermined threshold value. (S208)

When determining any one of the deviation averages (ΔD1_av and ΔD2_av) exceeds the predetermined threshold value in step 208, the controller 900 may control the sound output part 940 disposed in the air cleaner 10 such that the sound output part generates a voice alarm or a sound alarm indicating that air quality around the first sensor hub 20*a* or the second sensor hub 20*b* is rapidly deteriorating. (S208)

For example, the generated voice alarm, as described above, may include an alarm phrase such as "Indoor air pollution levels are rapidly increasing. Ventilation is encouraged."

The step of changing into the second pollution orientation mode (S210) may include detailed steps as illustrated in FIGS. 24 to 27.

Referring to FIG. 24, the controller 900 may rotate the first circulator 300 in the up-down direction by driving the first gear motor 331*a* of the air cleaner 10 such that the first circulator 300's slant angle b is at 65 degrees, may sense a position of the first sensor hub 20*a* and the second sensor hub 20*b* using the UWB module 800 while rotating the first circulator 300 in the left-right direction in the range of rotation angles a1 by driving the second gear motor 333*a*, and may generate first position data of the first sensor hub 20*a* and second position data of the second sensor hub 20*b*. (S2101)

When the first position data and the second position data are generated, the controller 900 may calculate a first azimuth as1 and a first distance L1 of the first sensor hub 20*a* and a second azimuth as2 and a second distance L2 of the second sensor hub 20*b* with respect to the air cleaner 10 based on the first position data and the second position data. (S2102)

Then the controller 900 may drive the first fan motor 140 of the first air cleaning module 100 in the above ordinary operation mode. (S2103) That is, the first fan motor 140 may be controlled to operate in the ordinary automatic operation mode and the specific operation mode regardless of the pollution orientation mode.

Then the controller 900 may determine whether the first local dust concentration average and the second local dust concentration average all exceed the reference average. (S2104) That is, the controller may determine whether all or any one of areas around the first sensor hub 20*a* and the second sensor hub 20*b* require the operation in the pollution orientation mode.

When determining the first local dust concentration average and the second local dust concentration average all exceed the reference average in step 2104, the controller 900 may compare the first distance L1 and the second distance L2 calculated in step S2102. (S2105) Accordingly, as a result of comparison between the first distance L1 and the second distance L2, air may be supplied through the first circulator 300 to an area around any one of the first sensor hub 20*a* and the second sensor hub 20*b*, which is farther from the air cleaner 10 than the rest of the first sensor hub 20*a* and the second sensor hub 20*b*.

When the first distance L1 is greater than the second distance L2 in step 2105, the controller 900 may drive the second gear motor 333*a* of the first circulator 300 to move the first circulator 300 in the left-right direction such that the first circulator is oriented to a position of a rotation angle a1 corresponding to the first azimuth as1 calculated in step S2102, and accordingly, the first circulator 300 may be oriented toward the first sensor hub 20*a*. (S2106) Thus, the air discharge direction of the first circulator 300 may be oriented and fixed to the first sensor hub 20*a* farther from the air cleaner.

When the left-right movement of the first circulator 300 is completed in step 2106, the controller 900 may drive the third fan motor 320 such that air is discharged from the first circulator 300 at the strong wind level. (S2107)

Additionally, the controller 900 may drive the second fan motor 240 such that air is discharged from the second circulator 400 at the strong wind level in the automatic operation mode. (S2108)

Then the controller 900 may drive the third gear motor 430 to rotate the second circulator 400 such that the second circulator 400 is oriented to a position of a rotation angle a2 corresponding to the second azimuth as2. (S2109) Accordingly, the air discharge direction of the second circulator 400 may be oriented and fixed to the second sensor hub 20*b* closer to the air cleaner.

When the second distance L2 is greater than the first distance L1 in step 2105, the controller 900, as illustrated in FIG. 25, may drive the second gear motor 333*a* of the first circulator 300 to move the first circulator 300 in the left-right direction such that the first circulator is oriented to a position of a rotation angle a1 corresponding to the second azimuth as2 calculated in step S2102, and accordingly, the first circulator 300 may be oriented toward the second sensor hub 20*b*. (S2110) Thus, the air discharge direction of the first circulator 300 may be oriented and fixed to the second sensor hub 20*b* farther from the air cleaner.

When the left-right movement of the first circulator 300 is completed in step 2110, the controller 900 may drive the third fan motor 320 such that air is discharged from the first circulator 300 at the strong wind level. (S2111)

Additionally, the controller 900 may drive the second fan motor 240 such that air is discharged from the second circulator 400 at the strong wind level in the automatic operation mode. (S2112)

Then the controller 900 may drive the third gear motor 430 to rotate the second circulator 400 such that the second circulator 400 is oriented to a position of a rotation angle a2 corresponding to the first azimuth as1. (S2109) Accordingly, the air discharge direction of the second circulator 400 may be oriented and fixed to the first sensor hub 20*a* closer to the air cleaner.

Figure 26:
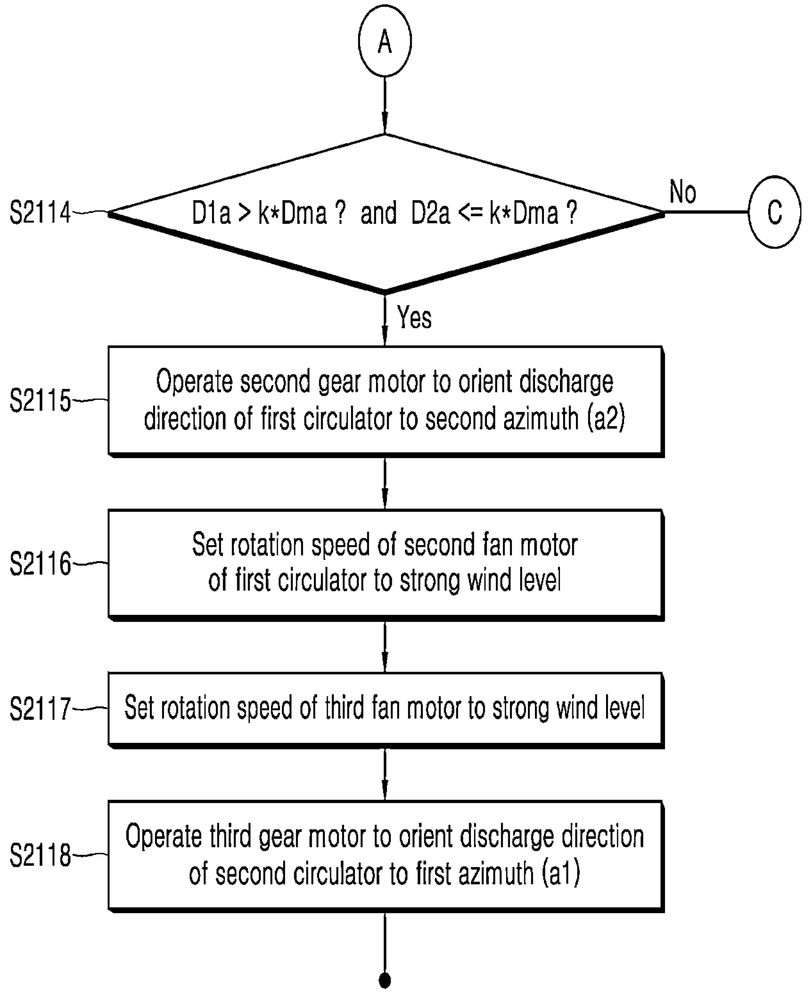

When determining any one of the first local dust concentration average and the second local dust concentration average exceeds the reference average in step 2104, the controller, as illustrated in FIG. 26, may determine which of the first local dust concentration average and the second local dust concentration average exceeds the reference average. (S2114)

When determining the first local dust concentration average only exceeds the reference average in step 2114, the controller 900 may perform the same step as the step of operating in the first pollution orientation mode in the control method (S100) of the air cleaning system 1 according to the first embodiment described above.

That is, the controller 900 may operate the second gear motor 333*a* such that the discharge direction F1 of the first circulator 300 is oriented to the first sensor hub 20*a* (S2115), operate the third fan motor 320 such that the air discharge amount of the first circulator 300 is at the strong wind level (S2116), operate the second fan motor 240 such that the air discharge amount of the second circulator 400 is at the strong wind level (S2117), and operate the third gear motor 430 such that the discharge direction F2 of the second circulator 400 is oriented to the first sensor hub 20*a* (S2117).

Figure 27:
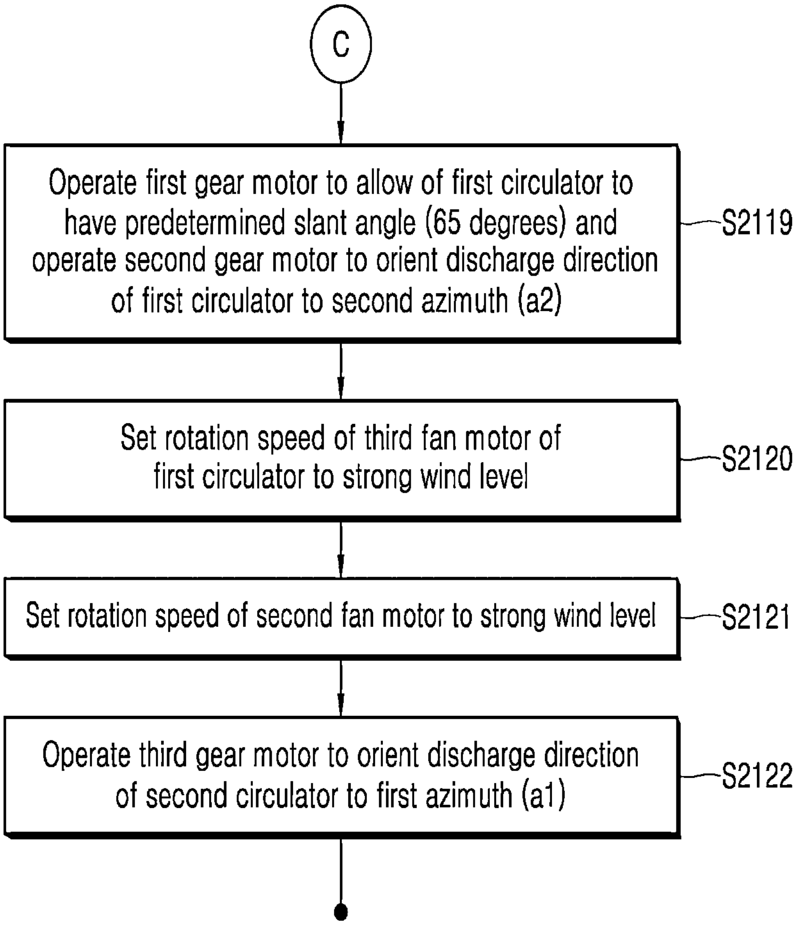

When determining the second local dust concentration average only exceeds the reference average in step 2114, the controller 900, as illustrated in FIG. 27, may operate the second gear motor 333*a* such that the discharge direction F1 of the first circulator 300 is oriented to the second sensor hub 20*b* (S2119), operate the third fan motor 320 such that the air discharge amount of the first circulator 300 is at the strong wind level (S2120), operate the second fan motor 240 such that the air discharge amount of the second circulator 400 is at the strong wind level (S2121), and operate the third gear motor 430 such that the discharge direction F2 of the second circulator 400 is oriented to the second sensor hub 20*b* (S2122).

When the change into the second pollution orientation mode is completed through the steps, the controller 900, as illustrated in FIG. 23, may determine a degree of local fine dust generation around the first sensor hub 20*a* and the second sensor hub 20*b* again while continuing to operate in the pollution orientation mode, again.

That is, the controller 900 may receive first local dust concentration data, second local dust concentration data and reference dust concentration data, respectively measured at the first time intervals, again while continuing to operate in the pollution orientation mode. (S211)

Additionally, the controller 900 may recalculate second time period reference average and second time period first local dust concentration average and second time period second local dust concentration average, as described above, using the first local dust concentration data, the second local dust concentration data and the reference dust concentration data received again, and may compare the recalculated reference average and the recalculated first local dust concentration average and the recalculated second local dust concentration average again. (S212 and S213)

When the recalculated first local dust concentration average and the recalculated second local dust concentration average are all smaller than or the same as the recalculated reference average as a result of comparison in step 213, the operation in the second pollution orientation mode may finish, and the operation mode may change into the above ordinary operation mode in step 202.

That is, it may be determined that the degree of local fine dust generation in areas where the first sensor hub 20*a* and the second sensor hub 20*b* are placed is reduced to that of the main body as a result of operation in the second pollution orientation mode. Accordingly, the operation in the pollution orientation mode may finish, and the operation mode may automatically change into the ordinary operation mode.

When the recalculated first local dust concentration average or the recalculated second local dust concentration average is greater than the recalculated reference average as a result of comparison in step 213, the controller may proceed with step 210, and the air cleaner 10 may continue to operate in the second pollution orientation mode.

Below, a control method (S300) of the air cleaning system 1 according to the third embodiment, illustrated in FIGS. 17 and 19, is described with reference to FIGS. 28 and 32.

As described in relation to the control methods (S100 and S200) of the air cleaning system 1 according to the first embodiment and the second embodiment, the controller 900 of the air cleaner 10 may start to operate the air cleaner 10 in the ordinary operation mode described above when power is on through the power supply 920. (S301 and S302)

Then the controller 900 may confirm whether the controller 900 connects to the first sensor hub 20*a*, the second sensor hub 20*b* and the third sensor hub 20*c* in a communicable manner through the wireless communicator 950, that is, whether the controller is paired with the first sensor hub 20*a*, the second sensor hub 20*b* and the third sensor hub 20*c*. (S303)

In step 303, when confirming non-pairing with the first sensor hub 20*a*, the second sensor hub 20*b* and the third sensor hub 20*c*, the controller 900 may continue the operation in the ordinary operation mode (S302).

When confirming paring with the first sensor hub 20*a*, the second sensor hub 20*b* and the third sensor hub 20*c* in step 303, the controller 900 may receive first local dust concentration data, second local dust concentration data and third local dust concentration data, measured at the first time intervals, from the first sensor hub 20*a*, the second sensor hub 20*b* and the third sensor hub 20*c* through the wireless communicator 950 and store the data in the memory 930. (S304)

Then the controller 900 may receive reference dust concentration data measured at the first time intervals through the main dust sensor Spm and store the data in the memory 930. (S305)

Then the controller 900 may calculate each second time period average of the reference dust concentration data and the first local dust concentration data, the second local dust concentration data and the third local dust concentration data that are respectively measured and stored at the first time intervals. (S306)

Then the controller 900 may compare a reference average, calculated by multiplying the calculated reference dust concentration average by a predetermined margin coefficient k, respectively with the calculated first local dust concentration average, the calculated second local dust concentration average and the calculated third local dust concentration average, and may determine whether the first local dust concentration average, the second local dust concentration average and the third local dust concentration average exceed the reference average. (S307)

When the first local dust concentration average, the second local dust concentration average and the third local dust concentration average are all less than or the same as the reference average as a result of determination in step 307, the controller 900 may proceed with step 302 and continue the operation in the ordinary operation mode.

When at least one of the first local dust concentration average, the second local dust concentration average and the third local dust concentration average exceeds the reference average as a result of determination in step 307, the controller may change the operation mode from the ordinary operation mode to a third pollution orientation mode. (S310)

As described regarding the control methods (S100 and S200) of the air cleaning system 1 according to the first embodiment and the second embodiment, regardless of/in addition to the step of changing into the third pollution orientation mode (S310), the controller 900 may add deviations (ΔD1, ΔD2 or ΔD3) of the first local dust concentration data or the second local dust concentration data or the third local dust concentration data, received at the first time intervals, and squares of the deviations (ΔD1, ΔD2 and ΔD3) for a third time period, and may determine whether any one of third time period deviation averages (ΔD1_av, ΔD2_av and ΔD3_av) of the added squares exceeds a predetermined threshold value. (S308)

When determining any one of the deviation averages (ΔD1_av, ΔD2_av and ΔD3_av) exceeds the predetermined threshold value in step 308, the controller 900 may control the sound output part 940 disposed in the air cleaner 10 such that the sound output part generates a voice alarm or a sound alarm indicating that air quality around the first sensor hub 20*a* or the second sensor hub 20*b* or the third sensor hub 20*c* is rapidly deteriorating. (S308)

For example, the generated voice alarm, as described above, may include an alarm phrase such as "Indoor air pollution levels are rapidly increasing. Ventilation is encouraged."

The step of changing into the third pollution orientation mode (S310) may include detailed steps as illustrated in FIGS. 24 to 27.

Figure 29:
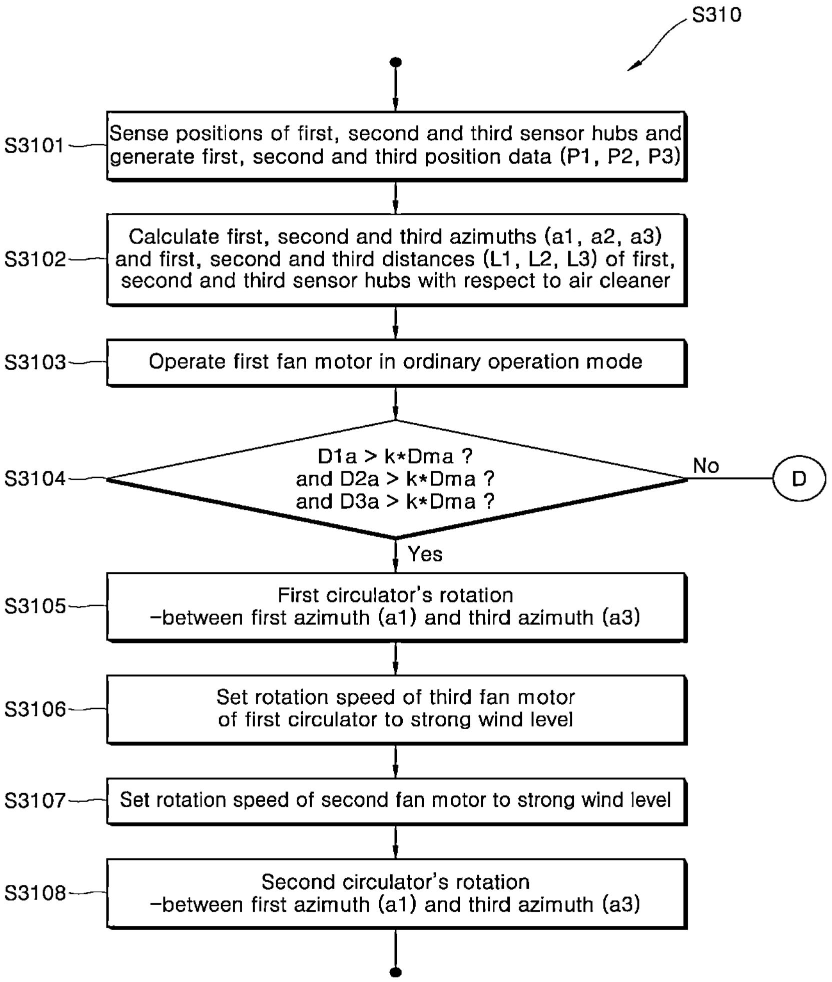

Referring to FIG. 29, the controller 900 may rotate the first circulator 300 in the up-down direction by driving the first gear motor 331*a* of the air cleaner 10 such that the first circulator 300's slant angle b is at 65 degrees, may sense a position of the first sensor hub 20*a*, the second sensor hub 20*b* and the third sensor hub 20*c* using the UWB module 800 while rotating the first circulator 300 in the left-right direction in the range of rotation angles a1 by driving the second gear motor 333*a*, and may generate first position data of the first sensor hub 20*a*, second position data of the second sensor hub 20*b* and third position data of the third sensor hub 20*c*. (S3101)

When the first position data, the second position data and the third position data are generated, the controller 900 may calculate a first azimuth as1 and a first distance L1 of the first sensor hub 20*a*, a second azimuth as2 and a second distance L2 of the second sensor hub 20*b* and a third azimuth as3 and a third distance L3 of the third sensor hub 20*c* with respect to the air cleaner 10 based on the first position data, the second position data and the third position data. (S3102)

Then the controller 900 may drive the first fan motor 140 of the first air cleaning module 100 in the above ordinary operation mode. (S3103) That is, the first fan motor 140 may be controlled to operate in the ordinary automatic operation mode and the specific operation mode regardless of the pollution orientation mode.

Then the controller 900 may determine whether the first local dust concentration average, the second local dust concentration average and the third local dust concentration average all exceed the reference average. (S3104) That is, the controller may determine whether all or any one of areas around the first sensor hub 20*a*, the second sensor hub 20*b* and the third sensor hub 20*c* require the operation in the pollution orientation mode.

When determining the first local dust concentration average, the second local dust concentration average and the third local dust concentration average all exceed the reference average in step 3104, the controller 900 may operate the first gear motor 331*a* such that the first circulator 300 continuously and repeatedly rotates in a range of rotation angles a1 determined between the first azimuth as1 to the third azimuth as3. (S3105) Accordingly, purified air may be evenly supplied to the first sensor hub to the third sensor hub 20*a*, 20*b*, 20*c* without concentrating on any one of the sensor hubs.

Then the controller 900 may drive the third fan motor 320 such that air is discharged from the first circulator 300 at the strong wind level. (S3106)

Additionally, the controller 900 may drive the second fan motor 240 such that air is discharged from the second circulator 400 at the strong wind level in the automatic operation mode. (S3107)

Then the controller 900 may operate the third gear motor 430 such that the second circulator 400 continuously and repeatedly rotates in a range of rotation angles a2 determined between the first azimuth as1 to the third azimuth as3. (S3108), as described in relation to the first circulator 300. Accordingly, purified air may be evenly supplied to the first sensor hub to the third sensor hub 20*a*, 20*b*, 20*c* without concentrating on any one of the sensor hubs.

Figure 30:
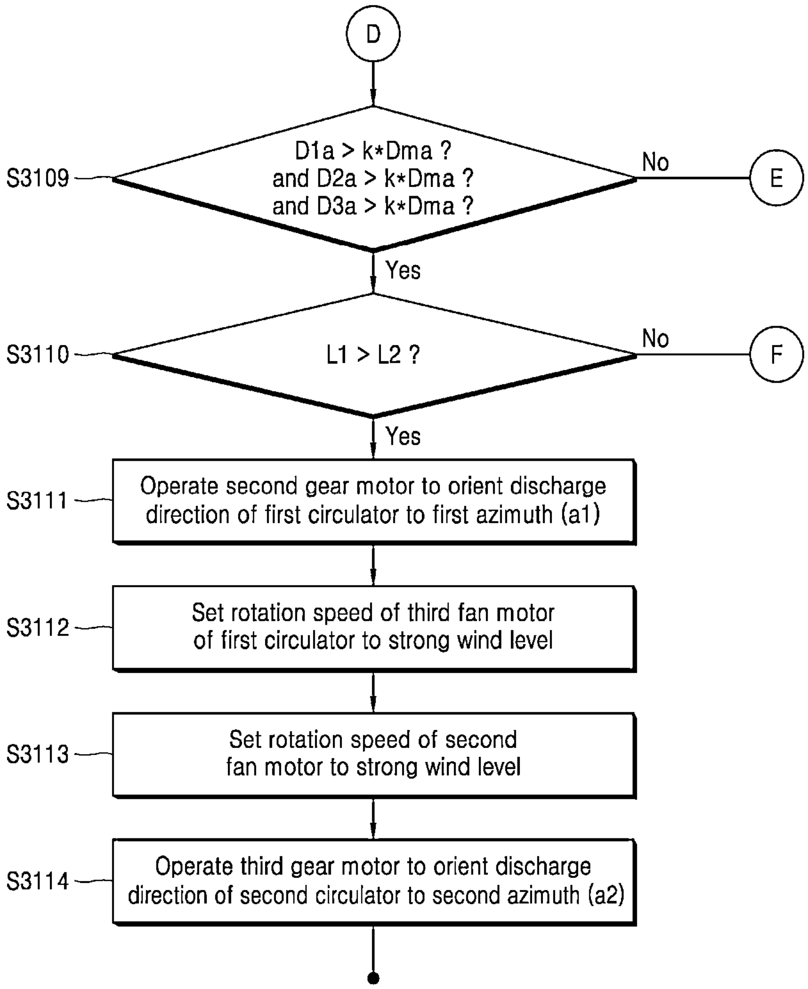

When determining some of the first local dust concentration average to the third local dust concentration average exceed the reference average in step 3104, the controller, as illustrated in FIG. 30, may determine which of the first local dust concentration average to the third local dust concentration average exceed the reference average. (S3109)

When determining the first local dust concentration average and the second local dust concentration average only exceed the reference average in step 3019, the controller 900 may perform the same step as the step of operating in the second pollution orientation mode in the control method (S200) of the air cleaning system 1 according to the second embodiment described above.

That is, the controller 900 may compare and determine the first distance L1 and the second distance L2 (S3110), and when determining the first distance L1 is greater than the second distance L2, may operate the second gear motor 333*a* such that the discharge direction F1 of the first circulator 300 is oriented to the first sensor hub 20*a* (S3111), operate the third fan motor 320 such that the air discharge amount of the first circulator 300 is at the strong wind level (S3113), operate the second fan motor 240 such that the air discharge amount of the second circulator 400 is at the strong wind level (S3113), and operate the third gear motor 430 such that the discharge direction F2 of the second circulator 400 is oriented to the second sensor hub 20*b* (S3117).

Figure 31:
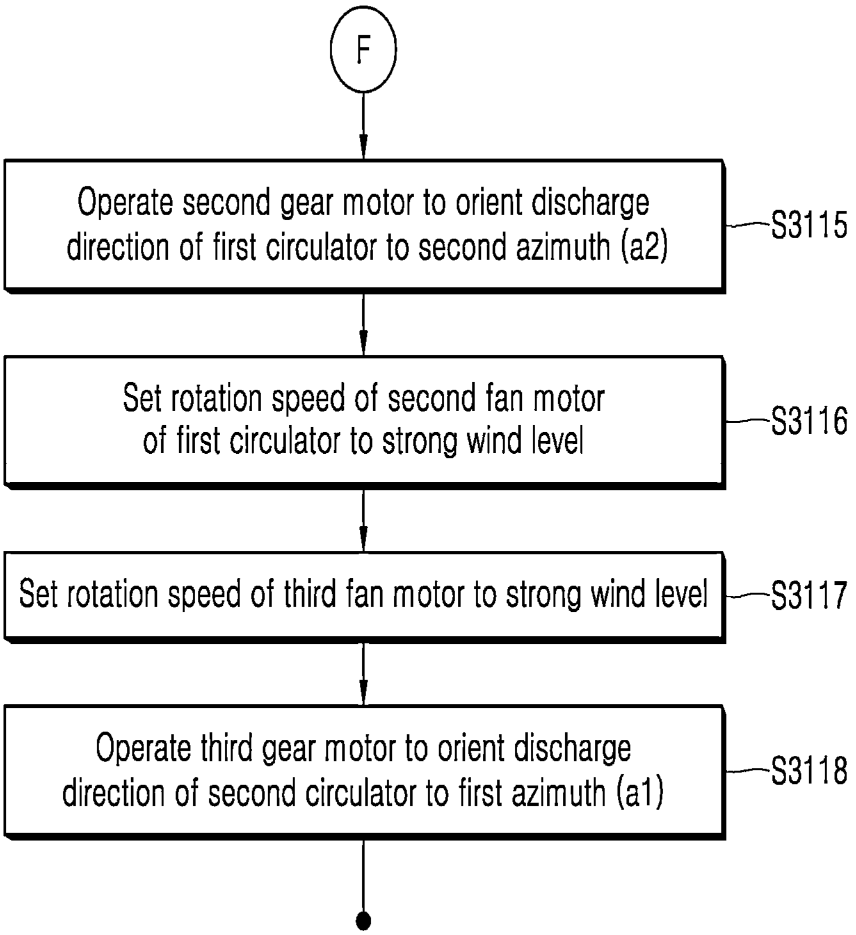

When determining the second distance L2 is greater than the first distance L1 in step 3110, the controller 900, as illustrated in FIG. 31, may operate the second gear motor 333*a* such that the discharge direction F1 of the first circulator 300 is oriented to the second sensor hub 20*b* (S3115), operate the third fan motor 320 such that the air discharge amount of the first circulator 300 is at the strong wind level (S3116), operate the second fan motor 240 such that the air discharge amount of the second circulator 400 is at the strong wind level (S3117), and operate the third gear motor 430 such that the discharge direction F2 of the second circulator 400 is oriented to the first sensor hub 20*a* (S3118).

Figure 32:
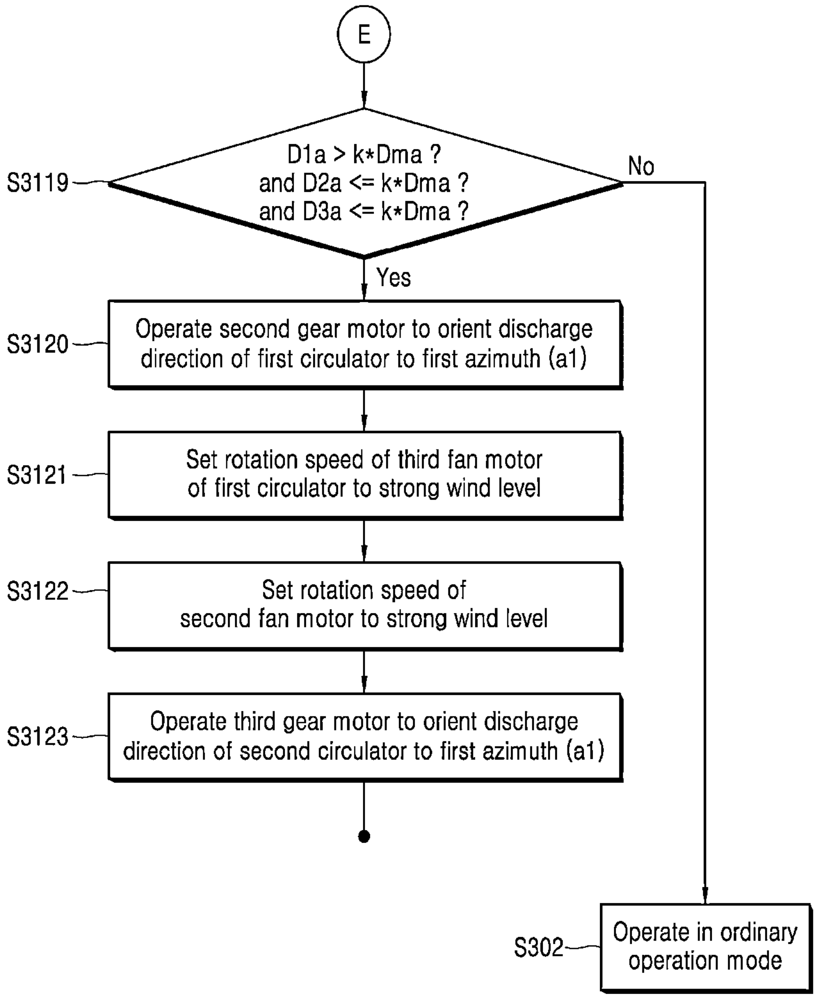

When determining the first local dust concentration average only exceeds the reference average in step 3019, the controller 900, as illustrated in FIG. 32, may perform the same step as the step of operating in the pollution orientation mode in the control method (S100) of the air cleaning system 1 according to the first embodiment described above.

That is, the controller 900 may operate the second gear motor 333*a* such that the discharge direction F1 of the first circulator 300 is oriented to the first sensor hub 20*a* (S3120), operate the third fan motor 320 such that the air discharge amount of the first circulator 300 is at the strong wind level (S3121), operate the second fan motor 240 such that the air discharge amount of the second circulator 400 is at the strong wind level (S3122), and operate the third gear motor

430 such that the discharge direction F2 of the second circulator 400 is oriented to the first sensor hub 20*a* (S3123).

FIG. 32 shows the change into the pollution orientation mode applied solely to the first sensor hub 20*a* among the first sensor hub to the third sensor hub 20*a*, 20*b*, 20*c*. However, this is just an example. The change into the pollution orientation mode may also be solely applied to any one of the second sensor hub 20*b* or the third sensor hub 20*c*. For convenience, repetitive description is avoided.

Figure 28:
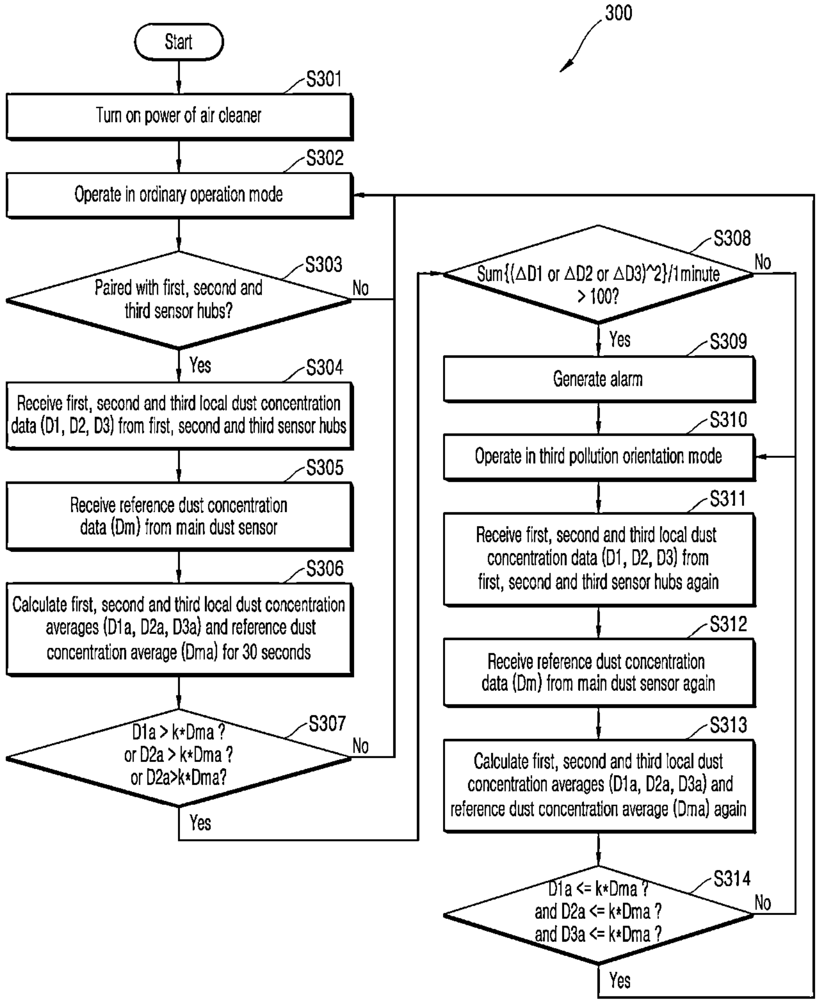
FIGS. 28 to 32 are flow charts for describing a control method of an air cleaner according to a third embodiment.

When the change into the third pollution orientation mode is completed through the steps, the controller 900, as illustrated in FIG. 28, may determine a degree of local fine dust generation around the first sensor hub 20*a*, the second sensor hub 20*b* and the third sensor hub 20*c* again while continuing to operate in the pollution orientation mode.

That is, the controller 900 may receive first local dust concentration data, second local dust concentration data and third local dust concentration data, and reference dust concentration data, respectively measured at the first time intervals, again while continuing to operate in the pollution orientation mode. (S311)

Additionally, the controller 900 may recalculate second time period reference average and second time period first local dust concentration average, second time period second local dust concentration average and second time period third local dust concentration average, as described above, using the first local dust concentration data, the second local dust concentration data and the third local dust concentration data and the reference dust concentration data received again, and may compare the recalculated reference average with the recalculated first local dust concentration average, the recalculated second local dust concentration average and the recalculated third local dust concentration average again. (S312 and S313)

When the recalculated first local dust concentration average to the recalculated third local dust concentration average are smaller than or the same as the recalculated reference average as a result of comparison in step 313, the operation in the second pollution orientation mode may finish, and the operation mode may change into the above ordinary operation mode in step 302.

That is, it may be determined that the degree of local fine dust generation in areas where the first sensor hub 20*a*, the second sensor hub 20*b* and the third sensor hub 20*c* are placed is reduced to that of the main body as a result of operation in the third pollution orientation mode. Accordingly, the operation in the pollution orientation mode may finish, and the operation mode may automatically change into the ordinary operation mode.

When any one of the recalculated first local dust concentration average to the recalculated third local dust concentration average is greater than the recalculated reference average as a result of comparison in step 313, the controller may proceed with step 310, and the air cleaner 10 may continue to operate in the second pollution orientation mode.

Figure 33:
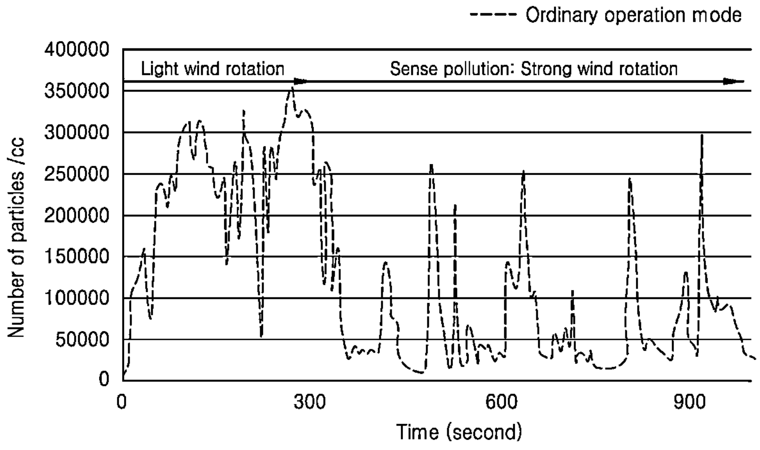
FIG. 33 is a chart for comparing and describing data showing a pollution purification ability in an ordinary operation mode and a pollution orientation mode.
Figure 33:
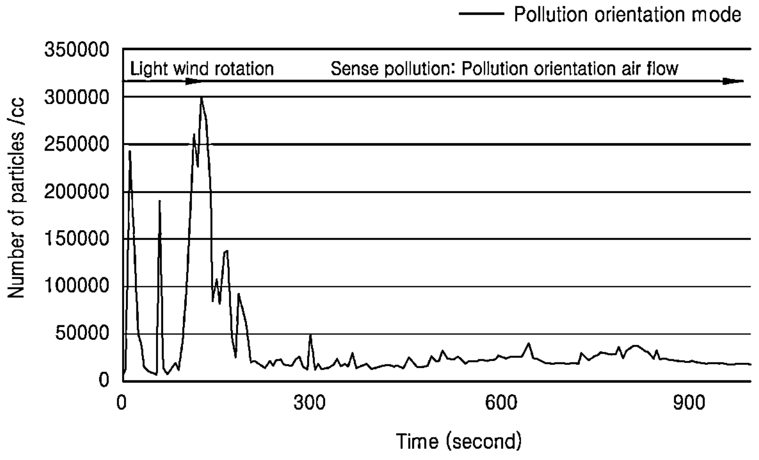

FIG. 33 is a chart for comparing and describing data showing a pollution purification ability in an ordinary operation mode and a pollution orientation mode.

The upper experiment data and the lower experiment data in FIG. 33 show results of measurement of a change in the number of fine dust particles, measured through the first sensor hub 20*a* disposed near an area where local pollution occurs. In both of the experiments, the results of the measurement are produced in a state in which the air cleaner 10 is spaced about 5 meters from the first sensor hub 20*a*.

The upper data show a state in which fine dust is purified when the air cleaner 10 operates in the ordinary operation mode, and the lower data show a state in which fine dust is purified when the air cleaner 10 operates in the pollution orientation mode.

Referring to the upper data, fine dust generates around the first sensor hub 20*a*, and about 5 minutes later, the main dust sensor Spm of the air cleaner 10 recognizes a rapid increase in fine dust concentrations, and the air cleaner 10 changes the operation from a light wind rotation operation to a strong wind rotation operation.

After the start of the strong wind rotation operation, fine dust concentrations rapidly decrease. However, a rapid increase and a rapid decrease in fine dust concentrations occur periodically and repeatedly since purified air is supplied by simply rotating the first circulator 300 and the second circulator 400.

Referring to the lower data, fine dust generates, and about 100 seconds later, the main dust sensor Spm recognizes a rapid increase in fine dust concentrations, and the operation mode of the air cleaner 10 automatically changes into the pollution orientation mode.

Since the operation mode changes into the pollution orientation mode and purified air is supplied to the position of the first sensor hub 20*a* in a concentrated manner through the first circulator 300 and the second circulator 400, concentrations of fine dust included in air around the first sensor hub 20*a* remain at a predetermined level or below continuously.

As described above, the experiments clearly show that the air cleaning system 1 according to the present disclosure may immediately sense occurrence of local pollution through a remote sensor hub disposed in an area where fine dust is likely generated, significantly reduce a time gap between fine dust generation and the air cleaner 10's response, and supply purified air to a position where the local pollution occurs in a concentrated manner, thereby quickly purifying indoor air.

The embodiments are described above with reference to a number of illustrative embodiments thereof. However, the present disclosure is not intended to limit the embodiments and drawings set forth herein, and numerous other modifications and embodiments can be devised by one skilled in the art without departing from the technical spirit of the disclosure. Further, the effects and predictable effects based on the configurations in the disclosure are to be included within the range of the disclosure though not explicitly described in the description of the embodiments.

[Description of Symbol]

| | |
|---|---|
| 1: Air cleaning system | 10: Air cleaner |
| 100: First air cleaning module | 120: First filter member |
| 130: First air blowing fan | 140: First fan motor |
| 200: Second air cleaning module | 220: Second filter member |
| 230: Second air blowing fan | 240: Second fan motor |
| 300: First circulator | 310: Third air blowing fan |
| 320: Third fan motor | 330: Rotation guide |
| 400: Second circulator | 410: Discharge guide |
| 411: Discharge grill | 420: Discharge body |
| 500: Base | 600: Partition |
| 700: Display | 900: Controller |
| 20: Sensor hub | 20a: First sensor hub |
| 20b: Second sensor hub | 20c: Third sensor hub |
| PM: Local fine dust | F1: First discharge direction |
| F2: Second discharge direction | as1: First azimuth |
| as2: Second azimuth | as3: Third azimuth |

The invention claimed is:

1. An air cleaning system, comprising:

a first purifier including a first case, a first suction portion disposed at the first case, and a first discharge portion for discharging a purified air upward;

a second purifier disposed over the first purifier, the second purifier including a second case, a second suction portion disposed at the second case, and a second discharge portion for discharging a purified air upward;

a first circulator disposed at the first discharge portion and configured to discharge the purified air from the first discharge portion and to rotate over a first angle of rotation in a left-right direction; and a second circulator disposed at the second discharge portion and configured to discharge the purified air from the second discharge portion and to rotate over a second angle of rotation in the left-right direction, wherein the first circulator and the second circulator are positioned at different heights in a vertical direction, and the first circulator and the second circulator are configured to rotate independently in the left-right direction.

2. The air cleaning system of claim 1, wherein the first angle of rotation and the second angle of rotation overlap to provide a more intense airflow than provided by either of the first circulator and the second circulator separately.

3. The air cleaning system of claim 2, wherein the first and second circulator are configured to discharge the purified air in a fixed same direction in the intense airflow.

4. The air cleaning system of claim 1, wherein the first circulator comprises an outer circumferential wall, an inner circumferential wall disposed inside the outer circumferential wall, and a plurality of vanes connecting the outer circumferential wall and the inner circumferential wall, the plurality of vanes being spaced apart at regular intervals and arranged in parallel.

5. The air cleaning system of claim 4, further comprising a partition disposed between a lower portion of the second purifier and an upper portion of the first purifier, the partition being configured to support the second purifier, wherein the partition extends radially to radially guide the purified air from the first purifier, and wherein the first circulator is rotatably disposed below the partition, the first circulator being configured to guide directionally the purified air from the first purifier.

6. The air cleaning system of claim 5, wherein the second circulator is disposed at an upper portion of the second purifier, the second circulator being further configured to rotate in an up and down direction.

7. The air cleaning system of claim 1, wherein the first circulator and the second circulator are configured to generate a dispersed airflow for discharging the purified air toward different directions, respectively.

8. The air cleaning system of claim 7, wherein the dispersed airflow includes a first dispersed airflow, a second dispersed airflow, and a third dispersed airflow, and wherein, in the first dispersed airflow, the first circulator and the second circulator are configured to discharge the purified air toward the different directions, respectively, without left-right rotation during the discharging, and wherein, in the second dispersed airflow, any one of the first circulator and the second circulator is configured to discharge the purified air without the left-right rotation while another of the first circulator and the second circulator is configured to rotate in the left-right direction, and wherein, in the third dispersed airflow, the first circulator and the second circulator are configured to rotate in the left-right direction, respectively.

9. The air cleaning system of claim 8, further comprising a first sensor hub and a second sensor hub spaced apart from the first purifier and the second purifier, the first sensor hub and the second sensor hub being configured to sense pollution in a first corresponding area and a second corresponding area, respectively, wherein, when sensed pollution degrees from each of the first sensor hub and the second sensor hub are greater than a predetermined reference value, the first circulator and the second circulator are configured to generate the dispersed airflow, and wherein, when the dispersed airflow is the second dispersed airflow, any one of the first circulator and the second circulator is configured to discharge the purified air toward the first sensor hub without the left-right rotation while another of the first circulator and the second circulator is configured to rotate with respect to the second sensor hub or to rotate between the first sensor hub and the second sensor hub.

10. The air cleaning system of claim 9, further comprising a third sensor hub spaced apart from the first sensor hub and the second sensor hub, the third sensor hub being configured to sense pollution in a third corresponding area, and wherein, when the dispersed airflow is the second dispersed airflow, the another of the first circulator and the second circulator is configured to rotate between the first sensor hub and an outmost sensor hub among the second sensor hub and the third sensor hub.

11. The air cleaning system of claim 7, further comprising a plurality of sensor hubs spaced apart from the first purifier and the second purifier, the plurality of sensor hubs being configured to sense pollution in corresponding areas of the plurality of sensor hubs, respectively, and wherein the first circulator is configured to discharge the purified air toward a furthest sensor hub among the plurality of sensor hubs while the second circulator is configured to discharge the purified air toward remaining sensor hubs among the plurality of sensor hubs.

12. The air cleaning system of claim 7, further comprising a plurality of sensor hubs spaced apart from the first purifier and the second purifier, the plurality of sensor hubs being configured to sense pollution in corresponding areas, respectively, wherein, when a sensed pollution degree from any one of the plurality of sensor hubs is greater than a reference value, the first circulator and the second circulator are configured to generate an overlapping airflow, and wherein, when two or more sensed pollution degrees from the plurality of sensor hubs are greater than the reference value, the first circulator and the second circulator are configured to generate the dispersed airflow.

13. The air cleaning system of claim 12, wherein the reference value is a predetermined reference value or a sensed pollution degree from a main sensor provided at one of the first purifier and the second purifier.

14. The air cleaning system of claim 13, wherein, when two sensed pollution degrees from the plurality of sensor hubs are greater than the reference value, the first circulator and the second circulator are configured to discharge the purified air toward corresponding sensor hubs, respectively, without the left-right rotation.

15. The air cleaning system of claim 14, wherein the first circulator is configured to discharge the purified air towards a long-distanced sensor hub of the plurality of sensor hubs without the left-right rotation while the second circulator is configured to discharge the purified air toward a short-distanced sensor hub of the plurality of sensor hubs without the left and right rotation.

16. The air cleaning system of claim 13, wherein, when two sensed pollution degrees from the plurality of sensor hubs are greater than the reference value, any one of the first circulator and the second circulator is configured to discharge the purified air without the left-right rotation while another of the first circulator and the second circulator is configured to rotate in the left-right direction.

17. The air cleaning system of claim 13, wherein, when three sensed pollution degrees from the plurality of sensor hubs are greater than the reference value, the first circulator and the second circulator are configured to rotate in the left-right direction.

18. The air cleaning system of claim 1, further comprising a plurality of sensor hubs spaced apart from the first purifier and the second purifier, the plurality of sensor hubs being configured to sense pollution in corresponding areas of the plurality of sensor hubs, respectively, wherein, when a sensed pollution degree from any one of the plurality of sensor hubs reaches a predetermined cooking pollution degree or a change in sensed pollution degree from any one of the plurality of sensor hubs is greater than a reference value, the first circulator and the second circulator are configured to discharge the purified air toward the any one of the plurality of sensor hubs.

19. The air cleaning system of claim 1, further comprising a plurality of sensor hubs spaced apart from the first purifier and the second purifier, the plurality of sensor hubs being configured to sense pollution in corresponding areas, respectively, wherein one of the plurality of sensor hubs is disposed at a cooking area, and wherein the first circulator and the second circulator are configured to discharge the purified air toward the cooking area.

20. An air cleaning system, comprising:

a first purifier including a first case, a first suction portion disposed at the first case, and a first discharge portion for discharging a purified air upward;

a second purifier disposed over the first purifier, the second purifier including a second case, a second suction portion disposed at the second case, and a second discharge portion for discharging a purified air upward;

a first circulator disposed at the first discharge portion and configured to discharge the purified air from the first discharge portion and to rotate over a first angle of rotation in a left-right direction; and a second circulator disposed at the second discharge portion and configured to discharge the purified air from the second discharge portion and to rotate over a second angle of rotation in the left-right direction, wherein the first circulator and the second circulator are positioned at different heights in a vertical direction, and the first circulator and the second circulator are configured to rotate independently in the left-right direction, and wherein at least one of the first circulator and the second circulator comprises an outer circumferential wall, an inner circumferential wall disposed inside the outer circumferential wall, and a plurality of vanes connecting the outer circumferential wall and the inner circumferential wall, the plurality of vanes being spaced apart at regular intervals and arranged in parallel.

21. The air cleaning system of claim 20, wherein the plurality of vanes are extended vertically, and wherein at least a part of each of the plurality of vanes are inclined in a same direction.

22. The air cleaning system of claim 20, further comprising a plurality of sensor hubs spaced apart from the first purifier and the second purifier, the plurality of sensor hubs being configured to sense pollution in corresponding areas, respectively, wherein the first circulator and the second circulator are configured to discharge the purified air toward one of the plurality of sensor hubs for a same directional airflow to perform an intensive control, and the first circulator and the second circulator are configured to rotate respectively toward different sensor hubs among the plurality of sensor hubs to perform a disperse control.

23. The air cleaning system of claim 20, further comprising:

a plurality of sensor hubs spaced apart from the first purifier and the second purifier, the plurality of sensor hubs being configured to sense pollution in corresponding areas, respectively; and a main sensor provided at one of the first purifier and the second purifier, the main sensor being configured to sense pollution at the one of the first purifier and the second purifier, and wherein, when all sensed pollution degrees from the plurality of sensor hubs is greater than a sensed pollution degree of the main sensor, the first circulator and the second circulator are configured to rotate with rotation ranges of the first and second angles, respectively.

24. The air cleaning system of claim 23, wherein, when the sensed pollution degree of the main sensor is greater than all sensed pollution degrees from the plurality of sensor hubs, the first purifier and the second purifier are configured to discharge the purified air without a left-right rotation.

25. An air cleaning system, comprising:

a first purifier including a first case, a first suction portion disposed at the first case, and a first discharge portion for discharging a purified air upward;

a second purifier disposed over the first purifier, the second purifier including a second case, a second suction portion disposed at the second case, and a second discharge portion for discharging a purified air upward;

a first circulator disposed at the first discharge portion and configured to discharge the purified air from the first discharge portion; and a second circulator disposed at the second discharge portion and configured to discharge the purified air from the second discharge portion, a plurality of sensor hubs spaced apart from the first purifier and the second purifier, the plurality of sensor hubs being configured to sense pollution in corresponding areas, respectively, wherein the first circulator and the second circulator are positioned at different heights in a vertical direction, and the first circulator and the second circulator are configured to rotate independently in a left-right direction, and wherein the first circulator and the second circulator are configured to discharge the purified air fixedly toward one of the plurality of sensor hubs for a same directional airflow to perform an intensive control, and the first circulator and the second circulator are configured to rotate respectively toward different sensor hubs among the plurality of sensor hubs to perform a disperse control.

* * * * *